US010223775B2

United States Patent
Swami et al.

(10) Patent No.: US 10,223,775 B2
(45) Date of Patent: Mar. 5, 2019

(54) ARRAY CAMERA IMAGE COMBINATION WITH FEATURE-BASED GHOST REMOVAL

(71) Applicant: OmniVision Technologies, Inc., Santa Clara, CA (US)

(72) Inventors: Sarvesh Swami, San Jose, CA (US); Donghui Wu, San Mateo, CA (US)

(73) Assignee: OmniVision Technologies, Inc., Santa Clara, CA (US)

( * ) Notice: Subject to any disclaimer, the term of this patent is extended or adjusted under 35 U.S.C. 154(b) by 157 days.

(21) Appl. No.: 15/265,731

(22) Filed: Sep. 14, 2016

(65) Prior Publication Data

US 2018/0075587 A1    Mar. 15, 2018

(51) Int. Cl.
| | | |
|---|---|---|
| *G06K 9/00* | (2006.01) | |
| *G06T 5/00* | (2006.01) | |
| *G06T 5/50* | (2006.01) | |
| *H04N 5/247* | (2006.01) | |
| *H04N 5/265* | (2006.01) | |
| *G06T 5/20* | (2006.01) | |

(52) U.S. Cl.
CPC .............. *G06T 5/005* (2013.01); *G06T 5/002* (2013.01); *G06T 5/50* (2013.01); *H04N 5/247* (2013.01); *H04N 5/265* (2013.01); *G06T 5/20* (2013.01); *G06T 2207/10012* (2013.01); *G06T 2207/10024* (2013.01); *G06T 2207/20221* (2013.01)

(58) Field of Classification Search
CPC .. G06T 5/005; G06T 5/50; G06T 5/20; H04N 5/265; H04N 5/247
See application file for complete search history.

(56) References Cited

U.S. PATENT DOCUMENTS

| | | | | |
|---|---|---|---|---|
| 8,406,569 B2* | 3/2013 | Segall | ....................... | G06T 5/50 |
| | | | | 382/254 |
| 2007/0257934 A1* | 11/2007 | Doermann | ............... | G06K 9/36 |
| | | | | 345/606 |
| 2011/0211732 A1* | 9/2011 | Rapaport | .............. | G06F 3/1454 |
| | | | | 382/107 |
| 2014/0307960 A1* | 10/2014 | Sharma | .............. | H04N 5/23229 |
| | | | | 382/162 |
| 2014/0347521 A1* | 11/2014 | Hasinoff | .............. | H04N 5/2355 |
| | | | | 348/239 |

FOREIGN PATENT DOCUMENTS

CN    103226822 A    7/2013

OTHER PUBLICATIONS

Taiwanese Patent Application No. 106131468, English translation of Office Action dated Nov. 28, 2017, 9 pages.

\* cited by examiner

*Primary Examiner* — John B Strege
(74) *Attorney, Agent, or Firm* — Lathrop Gage LLP

(57) ABSTRACT

A method for combining array camera images with feature-based ghost removal includes (a) receiving, from an array camera, a first image and a second image respectively captured by a first camera and a second camera of the array camera, (b) rectifying and aligning the first image and the second image, (c) after said rectifying and aligning, identifying features in the first image to produce at least one first feature image each indicating features in the first image, and identifying features in the second image to produce at least one second feature image each indicating features in the second image, (d) comparing the at least one first feature image with the at least one second feature image to determine a ghost mask defining combination weights for combination of the first image with the second image.

20 Claims, 20 Drawing Sheets

```
1700

┌─────────────────────────────────────────────────────────────────────────┐
│ PERFORM STEPS 710, 720, AND 730, AND OPTIONALLY ONE OR BOTH OF STEPS 702 AND │
│ 715, OF METHOD 700 TO GENERATE RECTIFIED AND ALIGNED FIRST AND SECOND IMAGES │
│ AND CORRESPONDING FIRST AND SECOND FEATURE IMAGES, ONE OF THE FIRST AND │
│ SECOND IMAGES BEING OF HIGHER QUALITY WITHIN OVERLAPPING FOV            │
│                                   1710                                  │
└─────────────────────────────────────────────────────────────────────────┘
                                    │
                                    ▼
┌─────────────────────────────────────────────────────────────────────────┐
│ COMPARE THE AT LEAST ONE FIRST FEATURE IMAGE WITH THE AT LEAST ONE SECOND │
│ FEATURE IMAGE TO DETERMINE A GHOST MASK DEFINING COMBINATION WEIGHTS FOR │
│ COMBINATION OF THE FIRST IMAGE WITH THE SECOND IMAGE                    │
│                                   1740                                  │
│ ┌─────────────────────────────────────────────────────────────────────┐ │
│ │ DETERMINE GHOST MASK SUCH THAT COMBINATION WEIGHTS FOR THE HIGHER   │ │
│ │ QUALITY IMAGE INCREASE WITH INCREASING DIFFERENCE BETWEEN LOCATIONS OF │ │
│ │ THE FEATURES IN THE FIRST FEATURE IMAGE(S) AND LOCATIONS OF THE FEATURES │ │
│ │ IN THE SECOND FEATURE IMAGE(S)                                      │ │
│ │                              1742                                   │ │
│ └─────────────────────────────────────────────────────────────────────┘ │
│ ┌─────────────────────────────────────────────────────────────────────┐ │
│ │ CALCULATE VALUE OF EACH PIXEL OF THE GHOST MASK FROM DIFFERENCES    │ │
│ │ BETWEEN THE AT LEAST ONE FIRST FEATURE IMAGE AND THE AT LEAST ONE   │ │
│ │ SECOND FEATURE IMAGE IN LOCAL REGION SURROUNDING THE PIXEL OF GHOST │ │
│ │ MASK 742                                                            │ │
│ └─────────────────────────────────────────────────────────────────────┘ │
└─────────────────────────────────────────────────────────────────────────┘
              │                                         │
              ▼                                         ▼
┌──────────────────────────────────┐   ┌──────────────────────────────────┐
│ COMBINE THE FIRST IMAGE WITH THE │   │       OUTPUT GHOST MASK          │
│ SECOND IMAGE ACCORDING TO THE    │   │              750                 │
│ COMBINATION WEIGHTS OF THE GHOST │   └──────────────────────────────────┘
│ MASK, TO PRODUCE A COMBINED IMAGE│
│               760                │
└──────────────────────────────────┘
              │
              ▼
┌──────────────────────────────────┐
│      OUTPUT COMBINED IMAGE       │
│               770                │
└──────────────────────────────────┘
```

FIG. 17

ARRAY CAMERA IMAGE COMBINATION WITH FEATURE-BASED GHOST REMOVAL

BACKGROUND

An array camera is an array of individual cameras. Typically, the individual cameras cooperate to provide imaging functionality that cannot be achieved using one of the individual cameras alone. Array cameras have found use primarily in stereo imaging and surround or wide field-of-view (FOV) imaging. In stereo imaging, two individual cameras image the same scene from two slightly different vantage points to gain depth perception. In surround/wide-FOV imaging, two or more cameras placed at a common location are configured to view different portions of the surroundings, such that the cameras combine to provide an extended field of view as compared to that of a single camera. For example, several cameras on an automobile may face in different directions and cooperate to provide a 360 degree view of the surroundings.

More recently, array cameras have found new applications. One such application is dynamic zoom. In this application, the array camera includes one camera with a narrower field of view and another camera with a wider field of view. These two cameras are directed to view essentially the same scene, however with the narrower field-of-view camera providing a zoomed-in view of the scene. A pair of images captured by these two cameras may be combined to provide a range of zoom-levels, and this array camera thus has dynamic zoom capability, which otherwise, when using only a single camera, would require active mechanical adjustment of a variable imaging objective. In another application, an array camera includes a color camera and a monochrome camera having higher spatial resolution than the color camera. A color image of higher spatial resolution than that provided by the color camera itself may be obtained by utilizing the higher spatial resolution content provided by the monochrome camera. Array cameras may also be used in high dynamic range (HDR) imaging. Here, two individual cameras of the array camera, configured to view the same scene, capture images at different exposure times to improve the dynamic range over that of an individual camera. As compared to conventional HDR imaging based on a sequential image capture by a single camera, the array camera approach has the advantage that the two images are captured at the same time, which reduces the risk of motion artifacts commonly experienced in single camera based HDR imaging.

All of the above-mentioned new applications rely on proper combination (superposition) of images captured by two different cameras placed at slightly different positions and thus having slightly different views of the scene. Prior to image combination, purely geometrical corrections are applied to the captured images to rectify each of the captured images and align them with each other. The alignment process is based upon comparing pixel values between the individual images to find corresponding pixels. Frequently, imperfections in this image combination approach result in so-called ghosts in the combined images, that is, objects that appear misplaced or appear in duplicate in the combined image.

SUMMARY

In an embodiment, a method for combining array camera images with feature-based ghost removal includes receiving, from an array camera, a first image and a second image respectively captured by a first camera and a second camera of the array camera. The method rectifies and aligns the first image and the second image, whereafter the method identifies features in the first image to produce at least one first feature image each indicating features in the first image, and identifying features in the second image to produce at least one second feature image each indicating features in the second image. The method then compares the at least one first feature image with the at least one second feature image to determine a ghost mask defining combination weights for combination of the first image with the second image.

In an embodiment, a system for combining array camera images with feature-based ghost removal includes a processor and memory communicatively coupled with the processor. The memory includes machine-readable instructions configured to, upon execution by the processor, process a first image and a second image to determine a ghost mask defining combination weights for combining the first image with the second image. The machine-readable instructions include (a) geometric correction instructions that, upon execution by the processor, rectify and align the first image and the second image, (b) feature identification instructions that, upon execution by the processor and execution of the geometric correction instructions, identify features in the first image to produce at least one first feature image each indicating features in the first image, and identify features in the second image to produce at least one second feature image each indicating features in the second image, and (c) ghost mask generation instructions that, upon execution by the processor, compare the at least one first feature image with the at least one second feature image to determine the ghost mask.

BRIEF DESCRIPTION OF THE DRAWINGS

FIG. 17 illustrates a method for combining array camera images with feature based ghost removal, wherein one image is of higher quality within the FOV overlap between the cameras used to capture the images, according to an embodiment.

DETAILED DESCRIPTION OF THE EMBODIMENTS

The present disclosure describes image processing systems and methods for combination of images captured by different cameras of an array camera, as well as camera devices including such image processing systems. The array camera image combination systems and methods described herein identify features in the images and perform image combination with ghost removal based upon the identified features. This feature-based ghost removal method is capable of producing combined images without the ghost artifacts found in images generated by the conventional image combination technique, such as those based on purely geometrical image corrections.

Figure 1:
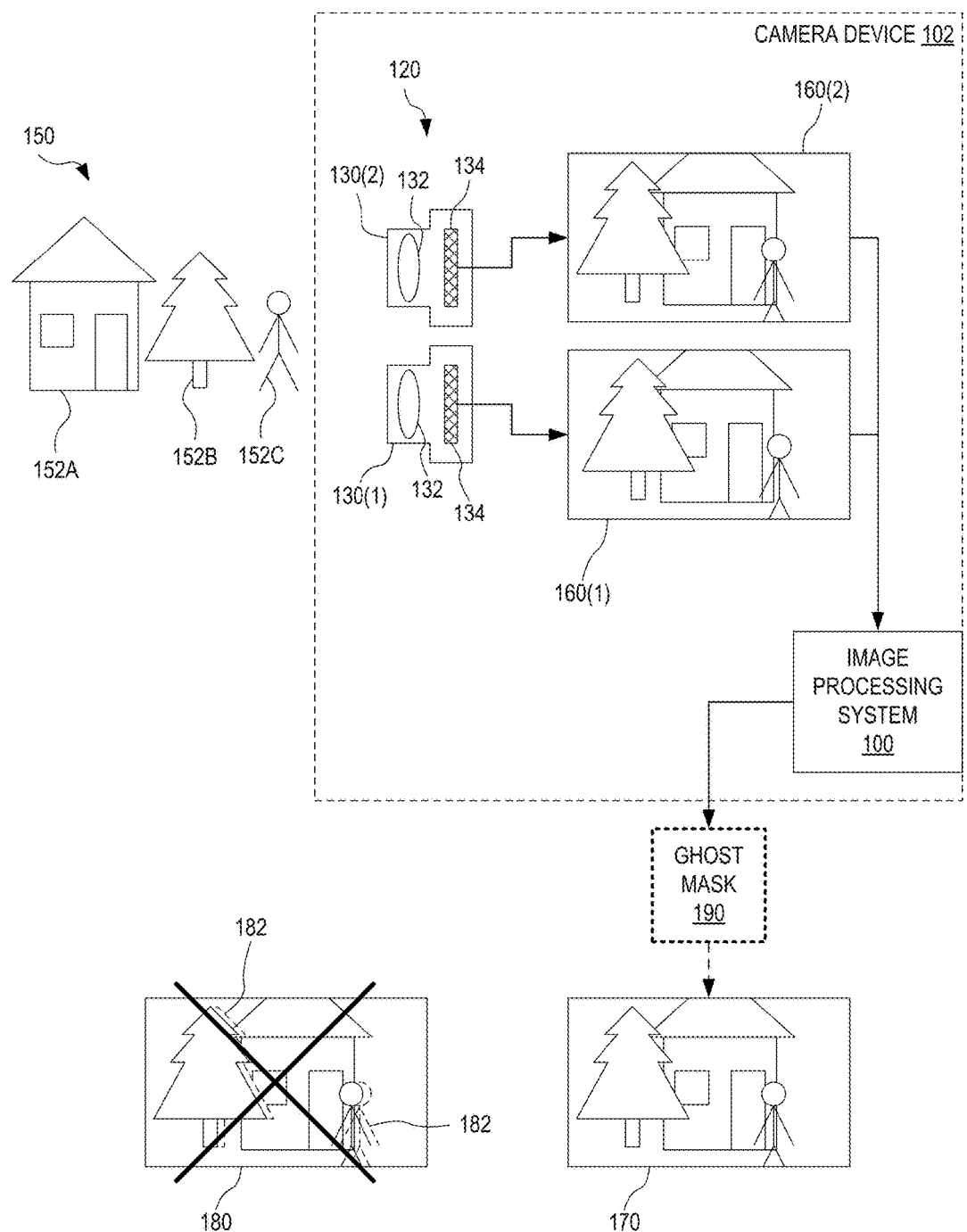
FIG. 1 illustrates the capability of an image processing system for combining array camera images with feature-based ghost removal, according to an embodiment.

FIG. 1 illustrates the capability of one exemplary image processing system 100 for combining array camera images with feature-based ghost removal. FIG. 1 shows image processing system 100 in an exemplary scenario, wherein image processing system 100 processes images captured by two individual cameras of an array camera 120. Array camera 120 includes two individual cameras 130(1) and 130(2). Each of cameras 130(1) and 130(2) includes an imaging objective 132 and an image sensor 134. Image sensor 134 may include a plurality of photosensitive pixels as known in the art. Cameras 130(1) and 130(2) are configured to image a scene 150 such that cameras 130(1) and 130(2) have the same field of view (FOV) or overlapping FOV. Cameras 130(1) and 130(2) may be identical or different from each other. For example, imaging objective 132 and/or image sensor 134 of camera 130(1) may be of a different type than imaging objective 132 and image sensor 134, respectively, of camera 130(2). Camera 130(1) captures an image 160(1) of scene 150, and camera 130(2) captures an image 160(2) of scene 150. However, due to the different vantage points of cameras 130(1) and 130(2), the positions of objects 152A, 152B, and 152C, occurring at different depths in scene 150, are at one set of relative positions in image 160(1) and at a different set of relative positions in image 160(2). For example, object 152C is shifted to the left in image 160(2) as compared to the position of object 152C in image 160(1).

Image processing system 100 identifies features in images 160(1) and 160(2), such as features associated with one or more of objects 152A, 152B, and 152C. Image processing system 100 utilizes these features to produce a ghost mask 190. The generation of ghost mask 190 is described in further detail below in reference to FIGS. 6, 7A-C. Ghost mask 190 is in the format of an image. Herein, an "image" refers to a dataset in the format of an array of pixel or an equivalent format such as a list of numbers defining entries of a two-dimensional matrix. Each pixel of ghost mask 190 defines a combination weight for the combination of corresponding pixels of images 160(1) and 160(2). Images 160(1) and 160(2) may be combined to produce a combined image 170. Pixel values of combined image 170 are determined according to the equation $$P_C = P_1 \cdot M + P_2 \cdot (1-M), \quad \text{(Eq. 1)}$$

wherein $P_1$ is the value of pixel $(x_1, x_2)$ of image 160(1), $P_2$ is the value of corresponding pixel $(x_1, x_2)$ of image 160(2), M is the value of corresponding pixel $(x_1, x_2)$ of ghost mask 190, and $P_C$ is the value of corresponding pixel $(x_1, x_2)$ of combined image 170. Without departing from the scope hereof, Eq. 1 may contain additional factors of proportionality, for example a normalization factor for ghost mask 190, a normalization factor for combined image 170, and/or a brightness correction factor for one or both of images 160(1) and 160(2).

For comparison, FIG. 1 also shows a combined image 180 obtained using purely geometrical correction techniques. Combined image 180 includes ghosts 182, duplicate images of portions of objects 152B and 152C, caused by imperfect correction for the different vantage points of cameras 130(1) and 130(2). By virtue of feature-based ghost mask 190, image processing system 100 is capable of producing combined image 170 without ghosts 182.

Although not shown in FIG. 1, certain embodiments of image processing system 100 include functionality to combine images 160(1) and 160(2), using ghost mask 190, to produce combined image 170, without departing from the scope hereof. Such embodiments may output combined image 170 and ghost mask 190, or output only combined image 170 while ghost mask 190 remains stored only within image processing system 100. Furthermore, image processing system 100 may be integrated with array camera 120 onboard a camera device 102. Camera device 102 may be a handheld device, such as a digital camera or a smartphone. Alternatively, camera device 102 may be a surveillance camera or a sub-system of a larger structure such as an automobile.

Without departing from the scope hereof, the imaging path for one or both of cameras 130(1) and 130(2) may be folded such that image sensor 134 of camera 130(1) and image sensor 134 of camera 130(2) face in two different directions. For example, cameras 130(1) and 130(2) may view scene 150 through a beamsplitter. The beamsplitter may be configured such that one of cameras 130(1) and 130(2) images light transmitted by the beamsplitter and the other one of cameras 130(1) and 130(2) images light reflected by the beamsplitter.

Figure 2A:
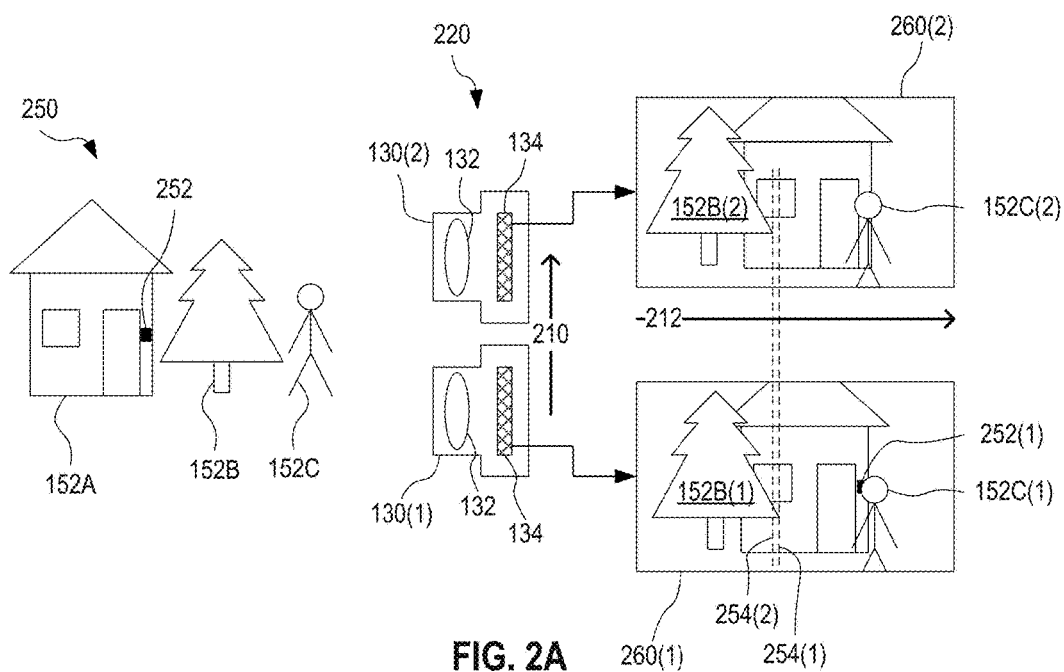
FIGS. 2A-C illustrate capabilities of the image processing system of FIG. 1 in further detail, according to an embodiment.
Figure 2B:
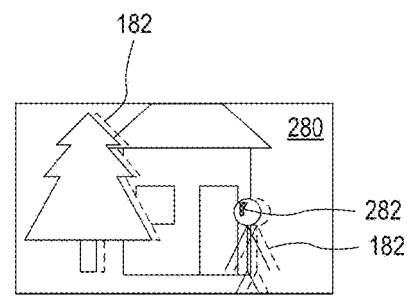
Figure 2C:
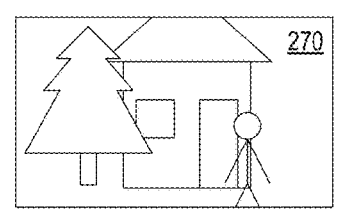

FIGS. 2A-C illustrate exemplary capabilities of image processing system 100 in further detail. FIG. 2A shows a scenario wherein array camera 120 images a scene 250. FIG. 2B shows a combined image 280 resulting from prior-art combination of images captured by array camera 120. FIG. 2C shows a combined image 270 produced using feature-based ghost mask 190 produced by image processing system 100. Combined image 270 is an example of combined image 170. FIGS. 2A-C are best viewed together.

Cameras 130(1) and 130(2) of an array camera 220 are offset from each other in a direction 210. Array camera 220 is an embodiment of array camera 120. The distance between cameras 130(1) and 130(2) along direction 210 is known as the baseline of array camera 120. Cameras 130(1) and 130(2) capture respective images 260(1) and 260(2) of a scene 250. Images 260(1) and 260(2) are examples of images 160(1) and 160(2), respectively. Direction 210 corresponds to the horizontal dimension 212 of images 260(1) and 260(2). Without departing from the scope hereof, direction 210 may instead correspond to the vertical dimension of images 260(1) and 260(2). Furthermore, cameras 130(1) and 130(2) may be offset from each other both vertically and horizontally such that direction 210 corresponds to a direction that has components along both vertical and horizontal dimensions of images 260(1) and 260(2), without departing from the scope hereof.

Scene 250 is an example of scene 150, which includes an object 252. A portion of object 252 is visible in image 260(1) as image element 252(1) next to image element 152C(1) which is an image of object 152C. However, in image 260(2), object 252 is occluded by object 152C. In image 260(2), object 252 is located behind the image of object 152C which appears in image 260(2) and image element 152C(2). When combining images 260(1) and 260(2) according to the purely geometrical correction methods of the prior art, a ghost 282 appears in the resulting combined image 280. Ghost 282 is an occlusion artifact and shows image element 252(1), visible only in image 260(1), overlaid on image element 152C(1) when, in reality, object 252 is behind object 152C and therefore cannot appear in front of object 152C in images of scene 250. A different type of artifact is related to misalignment. As discussed above in reference to FIG. 1, due to the different vantage points of cameras 130(1) and 130(2), object 152B is right-shifted in image 260(1), as shown by image element 152B(1) and line 254(1), and left-shifted in image 260(2), as shown by image element 152B(2) and line 254(2). In combined image 280, resulting from prior combination methods based on purely geometrical corrections, this misalignment leads to a ghost 182 having the appearance as a duplicate instance of a portion of object 152B. In contrast, image combination using ghost mask 190 as discussed above in reference to FIG. 1, properly handles the occlusion issue and corrects for the misalignment to produce combined image 270 without ghosts 182 and 282.

Figure 3:
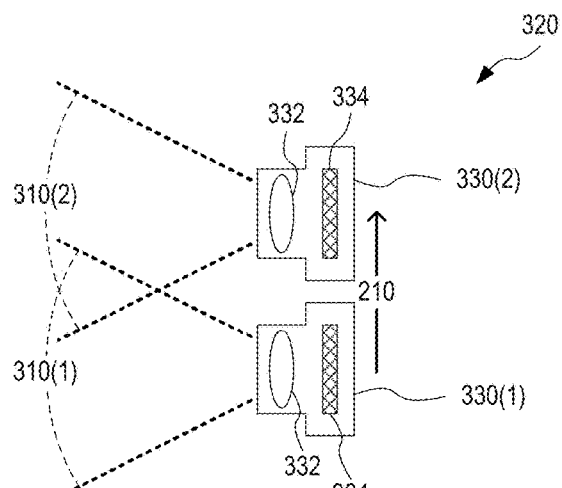
FIG. 3 illustrates an array camera including two substantially identical cameras, according to an embodiment.

FIG. 3 illustrates one exemplary array camera 320 including two substantially identical cameras 330(1) and 330(2) offset from each other in direction 210. Array camera 320 is compatible with cooperation with image processing system 100, optionally within an embodiment of camera device 102. Array camera 320 is an embodiment of array camera 220. Each of cameras 330(1) and 330(2) includes an imaging objective 332 and an image sensor 334. Cameras 330(1) and 330(2) are embodiments of cameras 130(1) and 130(2), respectively. Imaging objective 332 is an embodiment of imaging objective 132, and image sensor 334 is an embodiment of image sensor 134. In camera 330(1), imaging objective 332 and image sensor 334 cooperate to image a FOV 310(1). In camera 330(2), imaging objective 332 and image sensor 334 cooperate to image a FOV 310(2) that overlaps with FOV 310(1). FOV 310(1) and 310(2) are of same size but, due to the offset between cameras 330(1) and 330(2) in direction 210, FOVs 310(1) and 310(2) are shifted relative to each other. Array camera 320 is suitable for HDR applications for example. In such HDR applications, cameras 330(1) and 330(2) capture respective images 160(1) and 160(2) at different respective exposure times (and/or different respective gains), and image processing system 100 determines ghost mask 190 for combination of images 160(1) and 160(2) to produce an HDR image. Optionally, image processing system 100 performs the image combination, using ghost mask 190, to generate the HDR image.

Figure 4:
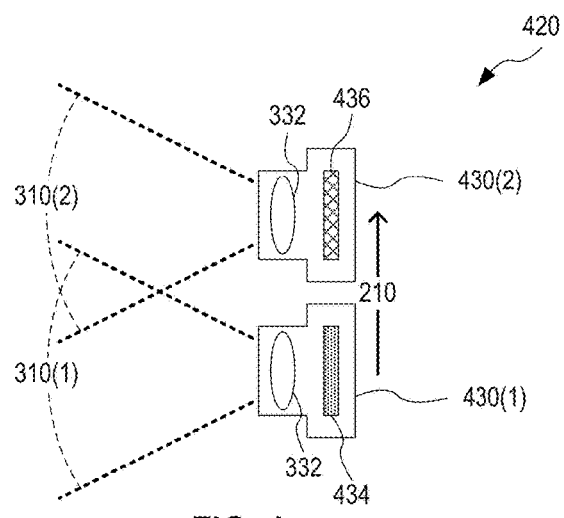
FIG. 4 illustrates an array camera including a color camera and a monochrome camera, according to an embodiment.

FIG. 4 illustrates one exemplary array camera 420 including a color camera 430(1) and a monochrome camera 430(2) offset from each other in direction 210. Array camera 420 is compatible with image processing system 100, optionally within an embodiment of camera device 102. Array camera 420 is an embodiment of array camera 220. Color camera 430(1) includes imaging objective 332 and a color image sensor 434, which cooperate to produce a color image 160(1) of FOV 310(1). Monochrome camera 430(2) includes imaging objective 332 and a monochrome image sensor 436, which cooperate to produce a monochrome image 160(2) of FOV 310(2). Color camera 430(1) is an embodiment of camera 130(1), monochrome camera 430(2) is an embodiment of camera 130(2), and each of color image sensor 434 and monochrome image sensor 436 is an embodiment of image sensor 134. Monochrome image sensor 436 has higher spatial resolution than color image sensor 434. In one embodiment, color image sensor 434 and monochrome image sensor 436 has the same number of photosensitive pixels but, in order to achieve color information, a color filter is overlaid on color image sensor 434 and several photosensitive pixels of color image sensor 434 cooperate to provide full color data for one spatial location. For example, photosensitive pixels of color image sensor 434 may be grouped in 2×2 arrays, wherein each 2×2 array forms a color pixel group that provide color data for one spatial location. In this example, the spatial resolution of monochrome image sensor 436 is a factor of four greater than the spatial resolution of color image sensor 434. In an embodiment, image processing system 100 determines a ghost mask 190 for combining a color image 160(1) produced by color camera 430(1) with a monochrome image 160(2) produced by monochrome camera 430(2). This ghost mask 190 may be used to generate a combined color image that has enhanced spatial resolution as compared to color image 160(1). Optionally, image processing system 100 performs the image combination, using ghost mask 190, to generate the combined color image with enhanced resolution.

Figure 5:
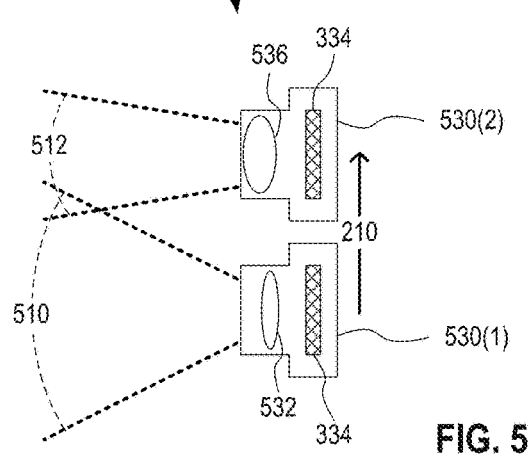
FIG. 5 illustrates an array camera including a wider-FOV camera and a narrower-FOV camera, according to an embodiment.

FIG. 5 illustrates one exemplary array camera 520 including a wider-FOV camera 530(1) and a narrower-FOV camera 530(2) offset from each other in direction 210. Array camera 520 is compatible with cooperation with image processing system 100, optionally within an embodiment of camera device 102. Array camera 520 is an embodiment of array camera 220. Wider-FOV camera 530(1) includes a wider-FOV imaging objective 532 and image sensor 334, which cooperate to produce a wider-FOV image 160(1) of a FOV 510. Narrower-FOV camera 530(2) includes a narrower-FOV imaging objective 536 and image sensor 334, which cooperate to produce a narrower-FOV image 160(2) of a FOV 512. FOV 512 is narrower than FOV 510 and provides a zoomed-in view of a portion of the scene viewed by wider-FOV camera 530(1). Wider-FOV camera 530(1) is an embodiment of camera 130(1), narrower-FOV camera 530(2) is an embodiment of camera 130(2), and each of wider-FOV imaging objective 532 and narrower-FOV imaging objective 536 is an embodiment of imaging objective 132. Array camera 520 is suitable for dynamic-zoom applications for example. In such dynamic-zoom applications, wider-FOV image 160(1) produced by wider-FOV camera 530(1) and narrower-FOV image 160(2) produced by narrower-FOV camera 530(2) may be combined to produce an image representing a view that is essentially anywhere in the range between FOV 510 and FOV 512. For this purpose, image processing system 100 may determine a ghost mask 190 for combination of images 160(1) and 160(2) to produce a dynamically zoomed image. Optionally, image processing system 100 performs the image combination, using ghost mask 190, to generate the dynamically zoomed image.

Without departing from the scope hereof, image sensor 334 of wider-FOV camera 530(1) may be replaced by either one of image sensors 434 and 436, image sensor 334 of narrower-FOV camera 530(2) may be replaced by the other one of image sensors 434 and 436.

Figure 6:
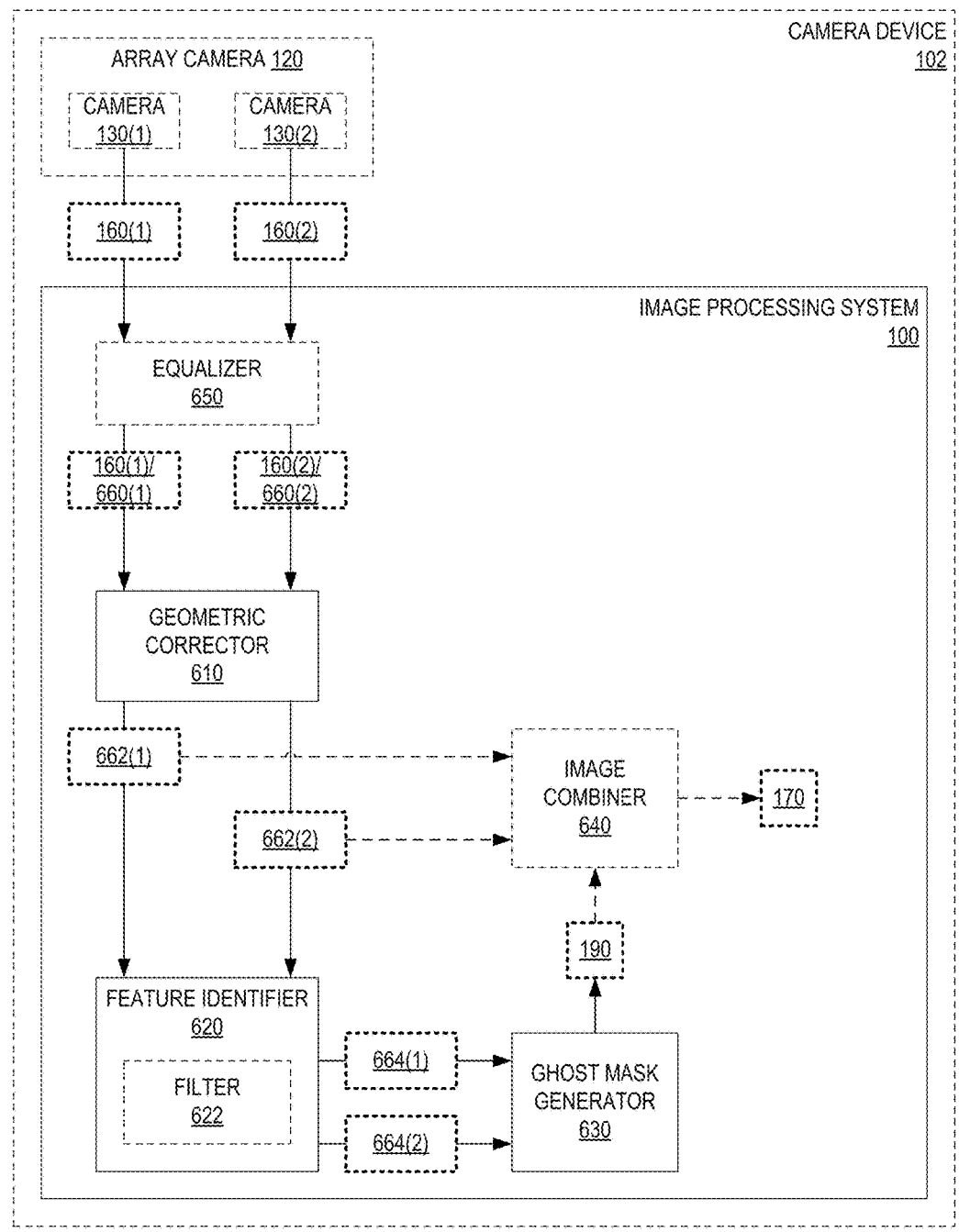
FIG. 6 is a block diagram illustrating the image processing system of FIG. 1 in further detail, according to an embodiment.

FIG. 6 is a block diagram illustrating image processing system 100 in further detail. Image processing system 100 includes a geometric corrector 610, a feature identifier 620, and a ghost mask generator 630. Image processing system 100 receives images 160(1) and 160(2) captured by cameras 130(1) and 130(2), respectively.

Geometric corrector 610 rectifies captured images 160(1) and 160(2) (or equalized images 660(1) and 660(2) as will be discussed in further detail below), and aligns the rectified captured images 160(1) and 160(2) with each other to produce respective rectified and aligned images 662(1) and 662(2). Rectification by geometric corrector 610 includes transforming captured images 160(1) and 160(2) onto a common image plane. Alignment by geometric corrector 610 includes aligning the rectified images to correct for a spatial shift therebetween. In an alternative embodiment, as will be discussed in further detail below, geometric corrector 610 operates on equalized images 660(1) and 660(2) instead of captured images 160(1) and 160(2).

Feature identifier 620 identifies features in each of rectified and aligned images 662(1) and 662(2) to produce respective feature images 664(1) and 664(2). Feature images 664(1) and 664(2) are images of certain features identified in the respective rectified and aligned images 662(1) and 662(2). Each of feature images 664(1) and 664(2) may be of same pixel format as the respective one of rectified and aligned images 662(1) and 662(2) but provide an enhanced view of the identified features. In certain embodiments, feature identifier 620 generates a plurality of feature images 664(1) for each rectified and aligned image 662(1), and also generates a plurality of feature images 664(1) for each rectified and aligned image 662(2). Each of plurality of feature images 664(1), and likewise the plurality of feature images 664(2), may be optimized to show a certain type of feature. In one example, one feature image 664(1) and one feature image 664(2) shows features of predominantly horizontal orientation, while another feature image 664(1) and another feature image 664(2) shows features of predominantly vertical orientation.

In an embodiment, feature identifier 620 includes a filter 622 that filters (a) rectified and aligned image 662(1) to produce one or more corresponding feature images 664(1) and (b) rectified and aligned image 662(2) to produce one or more corresponding feature images 664(2). Filter 622 may apply one or more of convolution kernel, a gradient filter, a highpass filter, and a filter known in the art, to each of rectified and aligned images 662(1) and 662(2) to produce respective feature images 664(1) and 664(2). In one example, filter 622 applies a Laplacian kernel of the form $$\begin{bmatrix} 1 & 1 & 1 \\ 1 & -8 & 1 \\ 1 & 1 & 1 \end{bmatrix}.$$

In another example, filter 622 applies a kernel of the form $$\begin{bmatrix} 0 & 2 & 0 \\ 2 & A & 2 \\ 0 & 2 & 0 \end{bmatrix},$$

wherein A is a negative number set to ensure proper normalization of the kernel. Throughout the present disclosure, kernels may be up-sampled to more than 3×3 entries to account for the relationship between pixel resolution and the typical size of image features, without departing from the scope hereof.

Ghost mask generator 630 compares feature image(s) 664(1) with feature image(s) 664(2) to determine ghost mask 190. The functionality of ghost mask generator 630 is discussed in further detail below in reference to FIGS. 7A-C.

In one embodiment, image processing system 100 includes an equalizer 650 that processes captured images 160(1) and 160(2) to produce respective equalized images 660(1) and 660(2) of same format and representing substantially the same FOV. This embodiment of image processing system 100 may be used to process images captured by array camera 420 or array camera 520. In one example, relating to array camera 420, image 160(1) is a monochrome image and image 160(2) is a color image of lower spatial resolution than captured image 160(1). In this example, equalization module 650 may up-sample color image 160(2) to be of same pixel resolution as monochrome image 160(1), and assign a luminance value to each pixel of the up-sampled version of color image 160(2) to produce equalized image 660(2), wherein the luminance value of each pixel of equalized image 660(2) is obtained from a group of color pixels around the same pixel location of the captured color image 160(2). Also in this example, equalizer 650 may output monochrome image 160(1) as equalized image 660(2). In another example, relating to array camera 520, image 160(2) is a zoomed in view of the scene imaged in image 160(1). In this example, equalizer 650 may (a) crop image 160(1) to the FOV (such as FOV 512) associated with image 160(2), (b) up-sample the cropped version of image 160(1) to include the same number of pixels as image 160(2), and (c) output the cropped, up-sampled version of image 160(2) as equalized image 660(2). Also in this example, equalizer 650 may output image 160(2) as equalized image 660(1). It is understood that, throughout the present disclosure, "rectified and aligned" images may refer to images that are both (a) equalized as discussed here in connection with equalizer 650, and (b) rectified and aligned.

The operations performed by geometric corrector 610 are similar to those performed in prior-art array image combination. However, image processing system 100 includes additional processing functionality configured to produce ghost mask 190. Ghost mask 190 may be applied in combination of rectified and aligned images 662(1) and 662(2) to produce combined image 170.

In certain embodiments, image processing system 100 includes an image combiner 640 that combines rectified and aligned images 662(1) and 662(2) according to the combination weights of ghost mask 190 and according to Eq. 1, to produce combined image 170. Without departing from the scope hereof, image combiner 640 may be configured to operate on equalized images 660(1) and 660(2), or images 160(1) and 160(2), instead of rectified and aligned images 662(1) and 662(2). In this case, image combiner 640 may include functionality to rectify and align images 160(1) and 160(2) or equalized images 660(1) and 660(2), and optionally also include functionality to equalize FOV and pixel format of images 160(1) and 160(2).

Optionally, image processing system 100 and array camera 120 are integrated in camera device 102. When implemented onboard camera device 102, image processing system 100 may include one or both of image combiner 640 and equalizer 650.

Figure 7A:
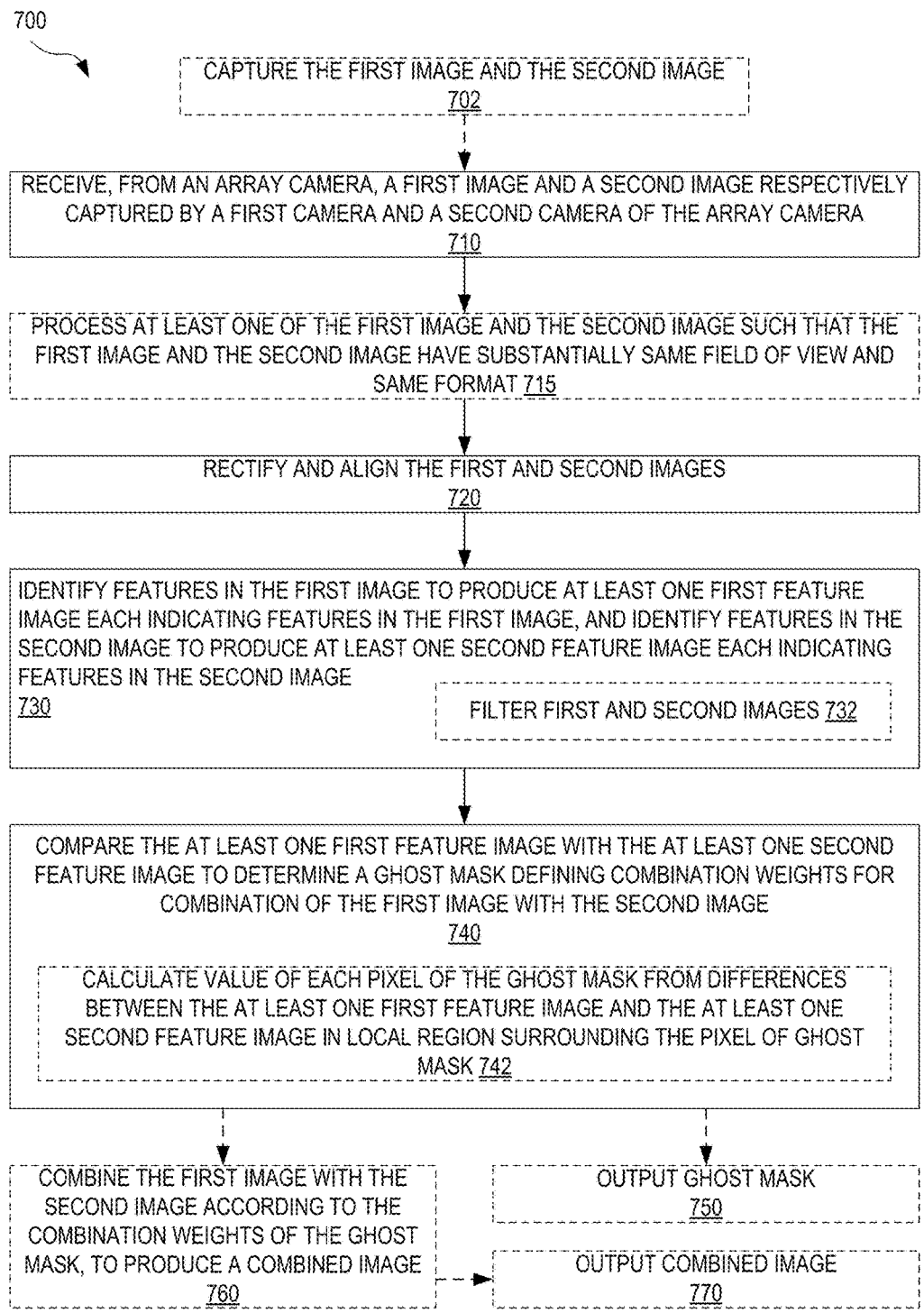
FIGS. 7A-C illustrate a method for combining array camera images with feature-based ghost removal, according to an embodiment.
Figure 7B:
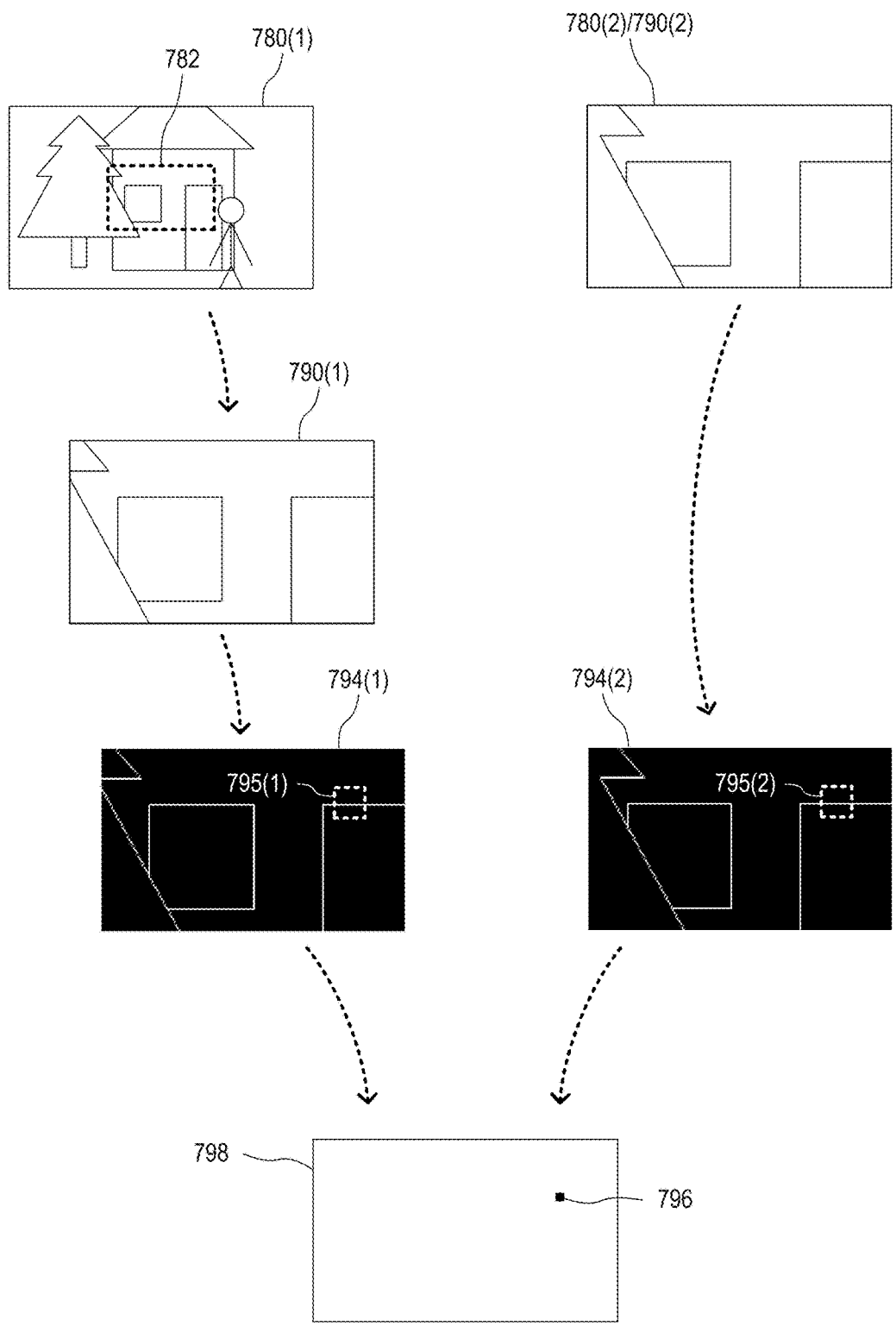
Figure 7C:
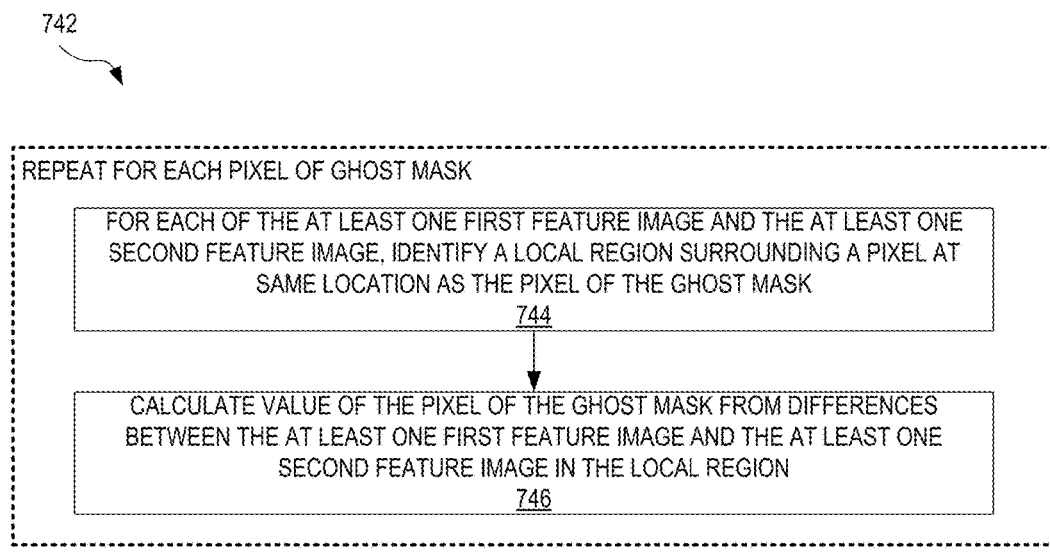

FIGS. 7A-C illustrate one exemplary method 700 for combining array camera images with feature-based ghost removal. Method 700 generates combined image 170 based upon ghost mask 190 and may be performed by image processing system 100. FIG. 7A shows a flowchart for method 700. FIG. 7B illustrates, by example, certain steps of method 700. FIG. 7C is a more detailed flowchart for ghost mask generation in method 700. FIGS. 7A-C are best viewed together.

A step 710 receives a first image and a second image from respective first and second cameras of an array camera. In one example of step 710, image processing system 100 receives images 160(1) and 160(2) captured by cameras 130(1) and 130(2), respectively, of array camera 120.

Optionally, a step 702 precedes step 710. In step 702, the array camera captures the first and second images of step 710. A first camera and a second camera of the array camera may capture the first and second images substantially simultaneously. In one example of step 702, camera 130(1) substantially simultaneously captures image 160(1), and camera 130(2) captures image 160(2).

A step 720 rectifies and aligns the first and second images. In one example of step 720, geometric corrector 610 rectifies and aligns images 160(1) and 160(2) as discussed above in reference to FIG. 6. In an embodiment, method 700 includes a step 715 performed after step 710 and before step 720. Step 715 processes the first and second images, received in step 710, to have the same pixel format and substantially the same field of view. In one example of step 715, equalizer 650 processes images 160(1) and 160(2) to produce respective equalized images 660(1) and 660(2), as discussed above in reference to FIG. 6. Referring again to step 720, in one example of step 720 relating to an embodiment of method 700 that includes step 715, geometrical correction module 610 rectifies and aligns equalized images 660(1) and 660(2) as discussed above in reference to FIG. 6.

FIG. 7B illustrates one example of image processing in steps 710 and 715. In this example of step 710, method 700 receives two images 780(1) and 780(2), which are examples of images 160(1) and 160(2), respectively. Image 780(2) is a zoomed-in view of portion 782 of the scene captured in image 780(1). Images 780(1) and 780(2) are, for example, captured by cameras 530(1) and 530(2) of array camera 520. Step 715 crops image 780(1) to include only portion 782, and then up-samples the cropped version of image 780(1) to have the same number of pixels as image 780(2), resulting in a equalized image 790(1). Step 715 outputs image 780(2) as equalized image 790(2) without modifying image 780(2). Equalized images 790(1) and 790(2) are examples of equalized images 660(1) and 660(2).

A step 730 identifies features in the rectified and aligned first image to produce at least one first feature image. Each of the at least one first feature image indicates features in the first image. Step 730 also identifies features in the rectified and aligned second image to produce at least one second feature image. Each of the at least one second feature image indicates features in the second image. In one example of step 730, feature identifier 620 identifies features in rectified and aligned image 662(1) and produces at least one resulting feature image 664(1) indicating features identified in rectified and aligned image 662(1), and feature identifier 620 identifies features in rectified and aligned image 662(2) and produces at least one resulting feature image 664(2) indicating features identified in rectified and aligned image 662(2).

Step 730 may include a step 732 of filtering the first and second images to produce the first and second feature images. In one example of step 732, filter 622 filters (a) rectified and aligned image 662(1) to produce at least one feature image 664(1) providing an enhanced view of features in rectified and aligned image 662(1), and (b) rectified and aligned image 662(2) to produce at least one feature image 664(2) providing an enhanced view of features in rectified and aligned image 662(2), as discussed above in reference to FIG. 6.

FIG. 7B illustrates one example of image processing performed in step 730. In this example of step 730, method 700 generates (a) a feature image 794(1) indicating features in image 780(1) and (b) a feature image 794(2) indicating features in image 780(2). Feature images 794(1) and 794(2) are examples of feature images 664(1) and 664(2).

A step 740 compares the at least one first image with the at least one second feature image to determine ghost mask 190. In one example of step 740, ghost mask generator 630 compares one or more features images 664(1) with one or more feature images 664(2) to determine ghost mask 190, as discussed above in reference to FIG. 6.

In an embodiment, step 740 includes a step 742. Step 742 calculates the value of each pixel of ghost mask 190. Step 742 is illustrated in more detail in FIG. 7C. For each pixel of ghost mask 190, step 742 performs steps 744 and 746. Step 744 identifies a local region in each of the at least one first feature image and the at least one second feature image. This local region surrounds a pixel that is at the same location as the pixel of ghost mask 190, for which the value is being calculated. The local region may be centered around the pixel that is at the same location as the pixel of ghost mask 190, or be another local region that includes the pixel that is at the same location as the pixel of ghost mask 190. Step 746 calculates the value of the pixel of ghost mask 190 from differences between the at least one first feature image and the at least one second feature image within the corresponding local region identified in step 744. In one example of step 744, for each pixel of ghost mask 190, ghost mask generator 630 identifies a local region in each of feature images 664(1) and 664(2), wherein the local region surrounds a pixel location that corresponds to the location of the pixel of ghost mask 190 being processed. In a related example of step 746, ghost mask generator 630 calculates the value of the pixel from differences between feature image(s) 664(1) and feature image(s) 664(2) within this corresponding local region. For example, ghost mask generator 630 may be configured to set the value of a pixel of ghost mask 190 to be (a) near one when there are large differences between feature image(s) 664(1) and feature image(s) 664(2) within the corresponding local region, to predominantly weigh data from image 160(2) in image combination, (b) near zero when feature image(s) 664(1) is/are very similar to feature image(s) 664(2) within the corresponding local region, to predominantly weigh data from image 160(1) in image combination, and (c) in a more centered range between zero and one when the differences between feature image(s) 664(1) and feature image(s) 664(2) are moderate, to give more equal weight to data from image 160(1) and data from image 160(2) in image combination.

FIG. 7B illustrates one example of image processing performed in step 742 to generate a ghost mask 798. Ghost mask 798 is an example of ghost mask 190. In this example of step 742, for each pixel 796 of a ghost mask 798, method 700 considers a local region 795(1) of feature image 794(1) and a local region 795(2) of feature image 794(2). Local region 795(1) surrounds a pixel location in feature image 794(1), which coincides with the location of pixel 796 in ghost mask 798. Local region 795(2) surrounds a pixel location in feature image 794(2), which coincides with the location of pixel 796 in ghost mask 798. Step 740 calculates the value of pixel 796 from differences between feature images 794(1) and 794(2) within respective local regions 795(1) and 795(2).

Optionally, method 700 includes a step 750 of outputting ghost mask 190. In one example of step 750, image processing system 100 outputs ghost mask 190.

Certain embodiments of method 700 include a step 760 of combining the first image with the second image according to the combination weights of ghost mask 190, so as to produce a combined image. In one example of step 760, image combiner 640 combines rectified and aligned images 662(1) and 662(2), according to combination weights of ghost mask 190 and according to Eq. 1, to produce combined image 170. Without departing from the scope hereof, step 760 may operate on images produced by any one of steps 710, 715, and 720 to perform the image combination. In embodiments of method 700, wherein step 760 is configured to combine images produced in step 710, step 760 may include functionality similar to that of step 720, and optionally step 715, however specifically tailored to prepare for image combination. In embodiments of method 700, wherein step 760 is configured to combine images produced in step 715, step 760 may include functionality similar to that of step 720, however specifically tailored to prepare for image combination.

An optional step 770 outputs the combined image generated in step 760. In one example of step 770, image processing system 100 outputs combined image 170.

Without departing from the scope hereof, the order of operations in steps 710, 715, 720, and 730 may be different from that shown in FIG. 7. For example, since the processing of the first image is independent from the processing of the second image up until step 740, method 700 may perform one or more of steps 710, 720, and 730 (and optionally step 715) based upon one of the first and second images prior to commencing the same processing on the other one of the first and second images.

Figure 8:
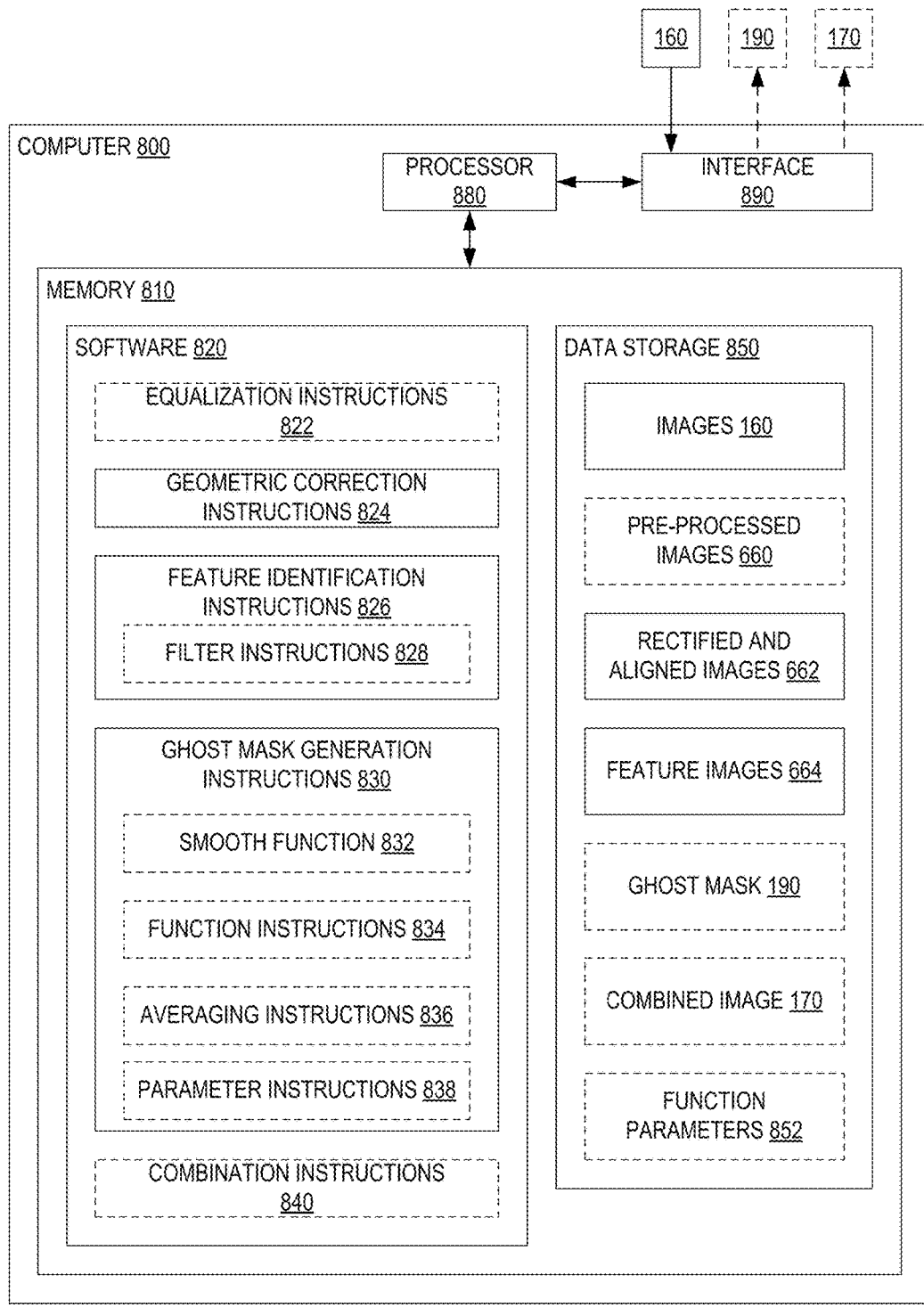
FIG. 8 illustrates a computer that implements the image processing system of FIG. 1 and the method of FIG. 7, according to an embodiment.

FIG. 8 illustrates one exemplary computer 800 that implements image processing system 100 and method 700. Computer 800 may be integrated with array camera 120 to form an embodiment of camera device 102. Computer 800 includes a non-transitory memory 810, a processor 880, and an interface 890. Memory 810 includes software 820 and data storage 850. Software 820 is machine-readable instructions encoded in memory 810. Upon execution by processor 880, software 820 performs method 700. Optionally, software 820 is encoded in a non-volatile portion of memory 810. Non-transitory memory 810 is for example of type ROM, Flash, magnetic tape, magnetic drive, optical drive, RAM, other non-transitory medium, or combinations thereof. The non-volatile portion of memory 810, in which software 820 is encoded, is for example of type read-only memory, Flash, ROM, ferroelectric RAM, magnetic tape, magnetic drive, optical drive, or a combination thereof. Interface 890 is for example a wired interface (such as CAN bus, $I^2C$ bus, LIN bus, Ethernet, USB, FireWire, Thunderbolt, or other wired communication protocol) and/or a wireless interface (such as Wi-Fi, Bluetooth, Low-energy Bluetooth, Cellular, or other wireless communication protocol). Processor 880 may be composed of a single processor, or include several processors. For example, certain portions of software 820 may be executed by a graphics processor.

Software 820 includes geometric correction instructions 824, feature identification instructions 826, and ghost mask generation instructions 830. Geometric correction instructions 824 cooperate with processor 880 to form an implementation of geometric corrector 610. Feature identification instructions 826 cooperate with processor 880 to form an implementation of feature identifier 620. Ghost mask generation instructions 830 cooperate with processor 880 to form an implementation of ghost mask generator 630. Software 820 may further include one or both of equalization instructions 822 and image combination instructions 840. When included in software 820, equalization instructions 822 cooperate with processor 880 to form an implementation of equalizer 650. When included in software 820, image combination instructions 840 cooperate with processor 880 to form an embodiment of image combiner 640.

Feature identification instructions 826 may include filter instructions 828. When included in software 820, filter instructions 828 cooperate with processor 880 to form an implementation of filter 622. Ghost mask generation instructions 830 may include one or more of a smooth function 832, function instructions 834, averaging instructions 836, and parameter instructions 838.

Interface 890 receives images 160(1) and 160(2) from an array camera such as array camera 120. Processor 880 stores images 160(1) and 160(2) to data storage 850.

In one embodiment, wherein software 820 includes equalization instructions 822, processor 880 retrieves images 160(1) and 160(2) from data storage 850 and executes equalization instructions 822 to perform an example of step 715, so as to produce equalized images 660(1) and 660(2). Processor 880 stores equalized images 660(1) and 660(2) to data storage 850. Subsequently, in this embodiment, processor 880 retrieves equalized images 660(1) and 660(2) from data storage 850 and executes geometric correction instructions 824 to perform an example of step 720, so as to produce rectified and aligned images 662(1) and 662(2). Processor 880 stores rectified and aligned images 662(1) and 662(2) to data storage 850.

In another embodiment, processor 880 retrieves images 160(1) and 160(2) from data storage 850 and executes geometric correction instructions 824 to perform an example of step 720, so as to produce rectified and aligned images 662(1) and 662(2). Processor 880 stores rectified and aligned images 662(1) and 662(2) to data storage 850.

After generation of rectified and aligned images 662(1) and 662(2), processor 880 retrieves rectified and aligned images 662(1) and 662(2) from data storage 850 and executes feature identification instructions 826 to perform an example of step 730, so as to produce feature images 664(1) and 664(2). Processor 880 stores feature images 664(1) and 664(2) to data storage 850. Subsequently, processor 880 retrieves feature images 664(1) and 664(2) from data storage 850 and executes ghost mask generation instructions 830 to perform an example of step 740, so as to produce ghost mask 190. Processor 880 stores ghost mask 190 to data storage 850 and/or performs an example of step 750 to output ghost mask 190 via interface 890.

In certain embodiments, wherein software 820 includes combination instructions 840, processor 880 retrieves ghost mask 190 from data storage 850. Processor 880 also retrieves rectified and aligned images 662(1) and 662(2), or alternatively images 160(1) and 160(2) or equalized images 660(1) and 660(2), and executes combination instructions 840 to perform an example of step 760, so as to produce combined image 170. Processor 880 stores combined image 170 to data storage and/or performs an example of step 770 to output combined image 170 via interface 890.

Without departing from the scope hereof, software 820, encoded in non-transitory memory, may exist as a stand-alone software product configured for implementation on a third-party computer. Also without departing from the scope hereof, computer 800 may include field programmable gate arrays for implementing at least a portion of the functionality of software 820 and processor 880.

Figure 9:
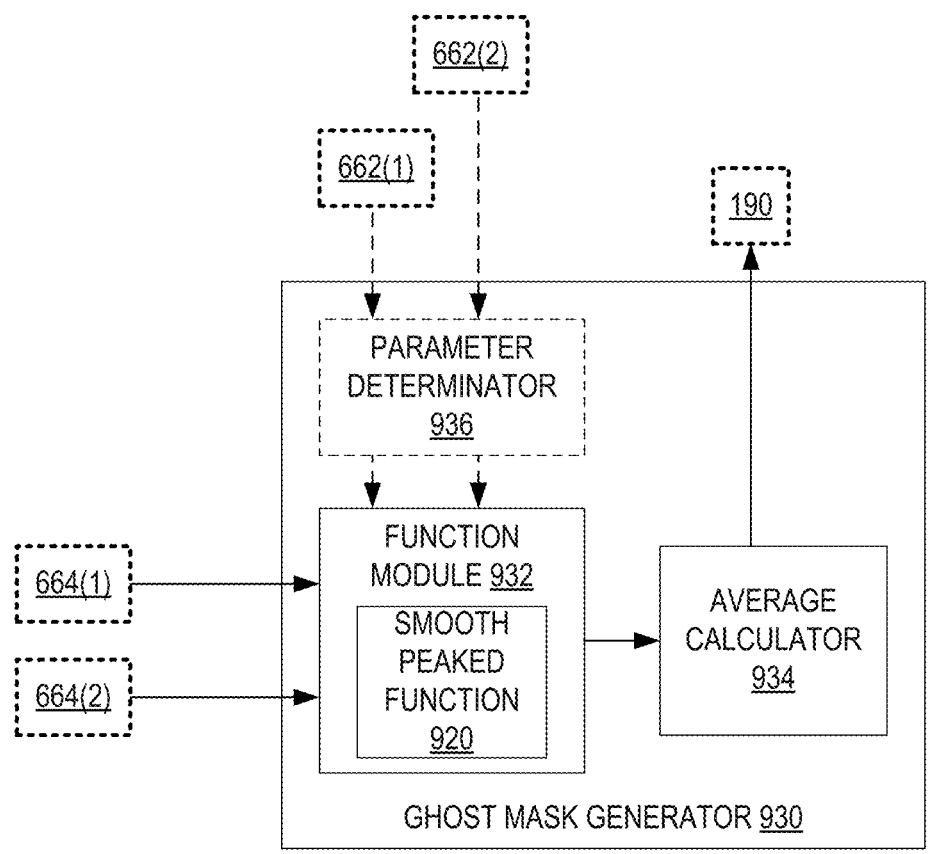
FIG. 9 illustrates a ghost mask generator that utilizes a smooth peaked function to determine a ghost mask, according to an embodiment.

FIG. 9 illustrates one exemplary ghost mask generator 930 that utilizes a smooth peaked function to determine ghost mask 190. Ghost mask generator 930 is an embodiment of ghost mask generator 630, and includes a function module 932 and an average calculator 934. Function module 932 further includes a smooth peaked function 920. Ghost mask generator 930 may also include a parameter determinator 936.

Function module 932 applies smooth peaked function 920 to differences between feature image(s) 664(1) and feature image(s) 664(2) within a local region of feature image(s) 664(1) and feature image(s) 664(2). Average calculator 934 averages these differences over the local region. Optional parameter determinator 936 processes rectified and aligned images 662(1) and 662(2) to determine parameters of smooth peaked function 920.

Referring now to FIGS. 8 and 9 in combination, smooth function 832 may implement smooth peaked function 920, function instructions 834 may cooperate with processor 880 to implement function module 932, averaging instructions 836 may cooperate with processor 880 to implement average calculator 934, and parameter instructions 838 may cooperate with processor 880 to implement parameter determinator 936. Upon execution of parameter instructions 838, processor 880 may store resulting parameters to data storage 850 as function parameters 852.

Figure 10:
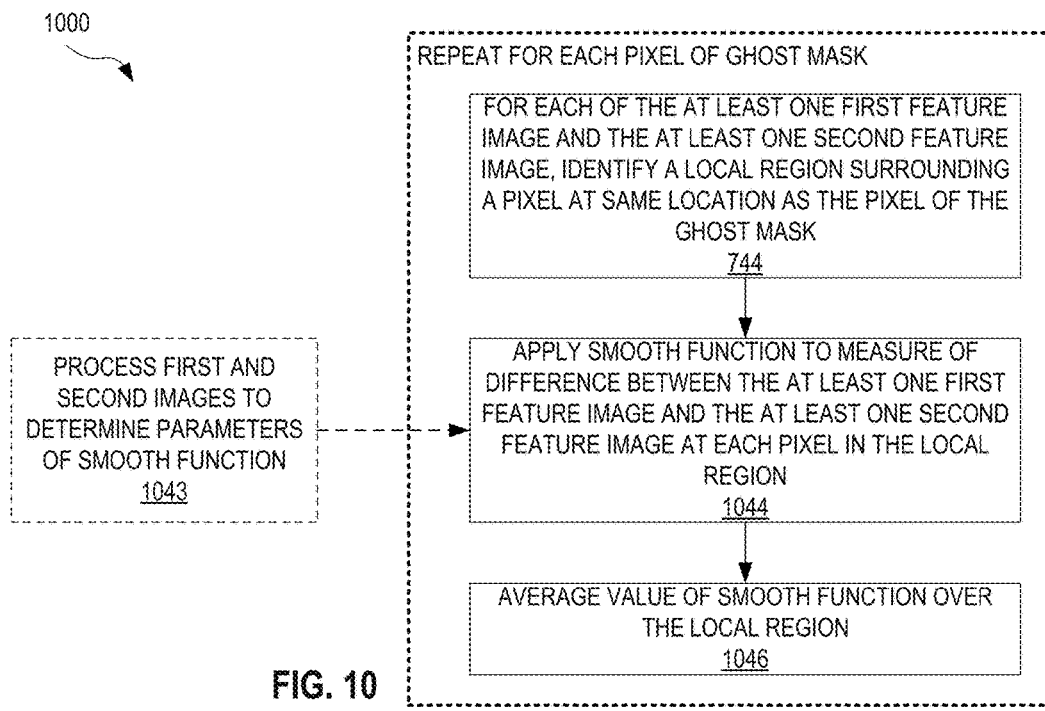
FIG. 10 illustrates a method for determining a ghost mask, according to an embodiment.

FIG. 10 illustrates one exemplary method 1000 that utilizes a smooth peaked function to determine ghost mask 190. Method 1000 is an embodiment of step 742 and may be performed by ghost mask generator 930.

For each pixel of ghost mask 190, method 1000 performs steps 744, 1044, and 1046. As discussed above in reference to FIG. 7C, step 744 identifies a local region in the at least one first feature image and the at least one second feature image. This local region surrounds a pixel that is at the same location as the pixel of ghost mask 190. Step 1044 applies a smooth peaked function to a measure of the difference between the at least one first feature image and the at least one second feature image. In one example of step 1044, function module 932 applies smooth peaked function 920 to a measure of the difference between feature image(s) 664(1) and feature image(s) 664(2) at each pixel within the local region. Step 1046 averages the value of the smooth peaked function over the corresponding local region and sets the value of the pixel of ghost mask 190 based upon this average of the smooth peaked function. In one example of step 1046, average calculator 934 calculates, for each pixel of ghost mask 190, the average of smooth peaked function 920 over the local region corresponding to the location of this pixel of ghost mask 190. Average calculator 934 then sets the value of each pixel of ghost mask 190 based upon the corresponding average of smooth peaked function 920.

Optionally, step 1044 is preceded by a step 1043 of processing the first and second images to determine one or more parameters of the smooth peaked function used in step 1044. In one example of step 1043, parameter determinator 936 processes rectified and aligned images 662(1) and 662(2) to determine parameters of smooth peaked function 920. Step 1043 may be performed separately for each pixel of ghost mask 190, or performed once to determine one or more parameters that applies to all of ghost mask 190. Steps 1044 and 1046 cooperatively form an embodiment of step 746.

Figure 11:
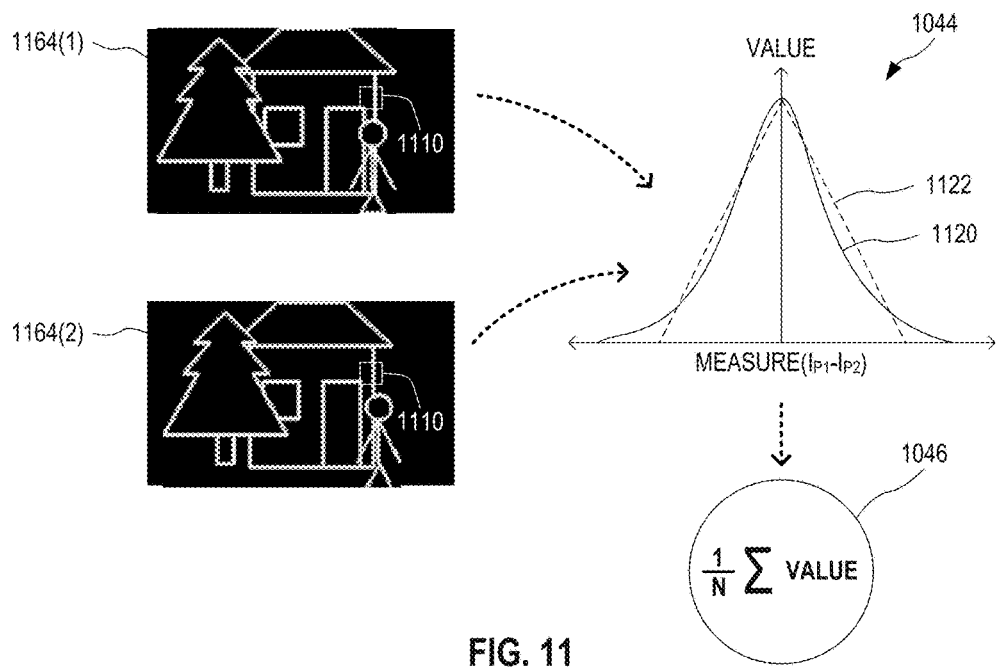
FIG. 11 illustrates exemplary use of a smooth peaked function in the method of FIG. 10.

FIG. 11 illustrates, by example, use of a smooth peaked function in step 1042 of method 1000. In the example shown in FIG. 11, method 1000 receives feature images 1164(1) and 1164(2). Feature image 1164(1) is an example of the at least one first feature image generated in step 1030, and feature image 1164(2) is an example of the at least one second feature image generated in step 1030. For each pixel in ghost mask 190, (a) step 744 identifies a corresponding local region in feature images 1164(1) and 1164(2), (b) step 1044 applies a smooth peaked function 1120 to a measure of the difference between the pixel value $I_{P1}$ of feature image 1164(1) and the pixel value $I_{P2}$ of feature image 1164(2), and (c) step 1046 averages the value of smooth peaked function 1120 over local region 1110 and sets the value of the pixel of ghost mask 190 based on the resulting average.

Smooth peaked function 1120 is an embodiment of smooth peaked function 920. In an embodiment, smooth peaked function attains its maximum when the measure of the difference between the pixel value $I_{P1}$ of feature image 1164(1) and the pixel value $I_{P2}$ of feature image 1164(2) is zero. Smooth peaked function 1120 may be or resemble any one of a Gaussian function, a Lorentzian function, a Cauchy distribution, a hyberbolic secant, a logistic distribution or another continuous function that has a single peak and decreases monotonically in both directions away from the peak. Without departing from the scope hereof, the smooth peaked function of step 1042 (and similarly smooth peaked function 920) may have shape different from that of smooth peaked function 1120. For example, the smooth peaked function of step 1042 (and similarly smooth peaked function 920) may be triangular as illustrated for a triangular smooth peaked function 1122 in FIG. 11.

Figure 12:
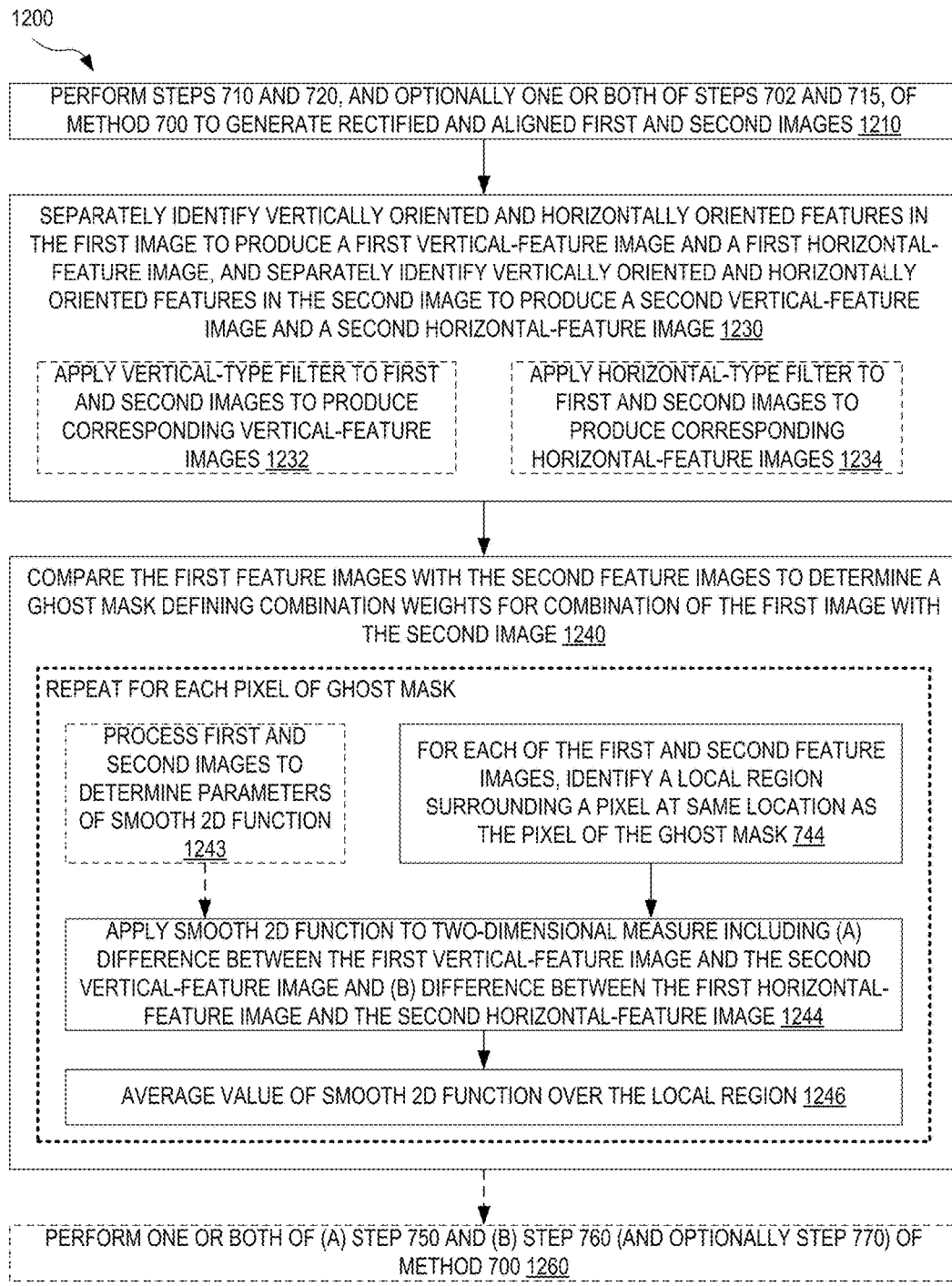
FIG. 12 illustrates a method for combining array camera images with feature-based ghost removal, which determines a ghost mask based upon separate identification of vertically oriented features and horizontally oriented features, according to an embodiment.

FIG. 12 illustrates one exemplary method 1200 for combining array camera images with feature-based ghost removal, which determines ghost mask 190 based upon separate identification of vertically oriented features and horizontally oriented features. Herein, a "vertically oriented" feature refers to a feature that is of predominant vertical orientation. It is appreciated that the orientation of a vertically oriented feature need not be exactly vertical. In one example, a vertically oriented feature is a feature having orientation closer to vertical than horizontal. Likewise, a "horizontally oriented" feature refers to a feature that is of predominant horizontal orientation. It is appreciated that the orientation of a horizontally oriented feature need not be exactly horizontal. In one example, a horizontally oriented feature is a feature having orientation closer to horizontal than vertical. Method 1200 is an embodiment of method 700, implementing method 1000, and utilizes a smooth peaked function to evaluate differences between features in images captured by one camera of an array camera and features in images captured by another camera of the array camera. Method 1200 may be performed by image processing system 100 implementing ghost mask generator 930.

In a step 1210, method 1200 performs steps 710 and 720, and optionally one or both of steps 702 and 715, to generate rectified and aligned first and second images from respective first and second images captured by respective first and second cameras of an array camera, as discussed above in reference to FIG. 10.

A subsequent step 1230 identifies vertically oriented features in the rectified and aligned first image to produce a first vertical-feature image indicating vertically oriented features in the rectified and aligned first image. Separately from this identification of vertically oriented features, step 1230 identifies horizontally oriented features in the rectified and aligned first image to produce a first horizontal-feature image indicating horizontally oriented features in the rectified and aligned first image. In a similar manner, step 1230 separately identifies vertically oriented features and horizontally oriented features in the rectified and aligned second image to produce a second vertical-feature image indicating vertically oriented features in the rectified and aligned second image and a second horizontal-feature image indicating horizontally oriented features in the rectified and aligned second image. In one example of step 1230, feature identifier 620 processes the rectified and aligned images 662(1) and 662(2). Feature identifier 620 (a) separately identifies vertically oriented features and horizontally oriented features in rectified and aligned image 662(1) to produce a vertical-feature image 664(1) and a horizontal-feature image 664(1), respectively, and (b) separately identifies vertically oriented features and horizontally oriented features in rectified and aligned image 662(2) to produce a vertical-feature image 664(2) and a horizontal-feature image 664(2), respectively. Step 1230 is an embodiment of step 1030.

In an embodiment, step 1230 includes steps 1232 and 1234. Step 1232 applies a vertical-type filter to each of the rectified and aligned first and second images to produce the first vertical-feature image and the second vertical-feature image. The vertical-type filter may be a horizontal gradient filter that detects change in the horizontal dimension. Change in the horizontal dimension is associated with a vertically oriented edge and, thus, a horizontal gradient filter detects vertically oriented features. In one implementation, the horizontal gradient filter incorporates a Sobel operator (kernel) such as:

$$\begin{bmatrix} +1 & 0 & -1 \\ +2 & 0 & -2 \\ +1 & 0 & -1 \end{bmatrix}.$$

In one example of step 1232, filter 622 applies a vertical-type filter to each of rectified and aligned images 662(1) and 662(2) to generate the vertical-feature image 664(1) and the vertical-feature image 664(2). Step 1234 applies a horizontal-type filter to each of the rectified and aligned first and second images to produce the first horizontal-feature image and the second horizontal-feature image. The horizontal-type filter may be a vertical gradient filter that detects change in the vertical dimension. In one implementation, the vertical gradient filter incorporates a Sobel operator (kernel) such as:

$$\begin{bmatrix} -1 & -2 & -1 \\ 0 & 0 & 0 \\ +1 & +2 & +1 \end{bmatrix}.$$

In one example of step 1232, filter 622 applies a horizontal-type filter to each of rectified and aligned images 662(1) and 662(2) to generate the horizontal-feature image 664(1) and the horizontal-feature image 664(2). Steps 1232 and 1234 form an embodiment of step 732. Each of steps 1232 and 1234 may further include filtering the feature images to suppress small differences, such as those caused by noise. Such additional filtering may include a low-pass filter, or raising the value of each pixel to the fourth power (optionally followed by suitable normalization). In addition, step 1230 may include normalizing the vertical-feature image(s) and horizontal-feature image(s). For example each of the vertical-feature image(s) and horizontal-feature image(s) may be normalized to a common overall luminance. Feature identifier 620 may perform such normalization.

A step 1240 compares the first vertical-feature image and the first horizontal-feature image with the second vertical-feature image and the second horizontal-feature image, respectively, to determine ghost mask 190. Step 1240 is an embodiment of method 1000. For each pixel of ghost mask 190, step 1240 performs steps 744, 1244, and 1246. Step 744 identifies a local region in each of the first vertical-feature image, the first horizontal-feature image, the second vertical-feature image, the second horizontal-feature image. This local region surrounds a pixel that is at the same location as the pixel of ghost mask 190. Step 1242 calculates the value of the pixel of ghost mask 190 from differences between (a) the first vertical-feature image and the first horizontal-feature image and (b) the second vertical-feature image and the second horizontal-feature image, respectively, in the local region determined in step 744.

Step 1244 applies a smooth peaked two-dimensional (2D) function to a two-dimensional measure of the difference between the first and second feature images within the local region. The measure includes (a) the difference between the first vertical-feature image and the second vertical-feature image and (b) the difference between the first horizontal-feature image and the second horizontal-feature image. The local region may be a square of m×m pixels. In one example, the local region constitutes about 1-5% of the full area of each feature image, such as approximately 2% of the full area or such as approximately 50×50 pixels. Step 1244 is an embodiment of step 1044. In certain embodiments, the smooth peaked 2D function is, for example, a 2D Gaussian function of the form $$W(k) = e^{-\left(\frac{(P_k^h - Q_k^h)^2}{2\sigma_h^2} + \frac{(P_k^v - Q_k^v)^2}{2\sigma_v^2}\right)},$$ (Eq. 2)

wherein $P_k^h$ is the value of pixel k of the first horizontal-feature image, $Q_k^h$ is the value of pixel k of the second horizontal-feature image, $P_k^v$ is the value of pixel k of the first vertical-feature image, $Q_k^v$ is the value of pixel k of the second vertical-feature image, $\sigma_h$ is a standard deviation parameter associated with the horizontal dimension, and $\sigma_v$ is a standard deviation parameter associated with the vertical dimension. $\sigma_h$ and $\sigma_v$ may be identical or different from each other. $\sigma_h$ and $\sigma_v$ may be at least partly derived from an evaluation of the accuracy of the rectification and alignment process performed in step 720, and the values of $\sigma_h$ and $\sigma_v$ may depend on the configuration of the array camera, e.g., whether the offset between the two cameras of the array camera is in the horizontal dimension, the vertical dimension, or both.

In one embodiment, method 1200 accepts as input first and second images captured by respective first and second cameras offset from each other in the horizontal dimension (as illustrated in FIGS. 2-5). In this embodiment, horizontal shifts between corresponding features in the first and second images may dominate over vertical shifts between corresponding features in the first and second images, such that horizontally oriented features may be more accurately aligned. Hence, in this embodiment, the value of $\sigma_v$ may be increased over the value of $\sigma_h$ to reflect better alignment of horizontally oriented features. In one example, $\sigma_v = 2\sigma_h$. The smooth peaked 2D function of Eq. 2 is an embodiment of smooth peaked function 920. Without departing from the scope hereof, smooth peaked function 920 may instead implement another smooth peaked 2D function that attains its peak at zero difference between the feature images. Exemplary alternative functions are listed above in reference to FIG. 9. In one example of step 1244, function module 932 applies a smooth peaked 2D function, such as that of Eq. 2, to a vertical-feature image 664(1), a vertical-feature image 664(2), a horizontal-feature image 664(1), and a horizontal-feature image 664(2).

Step 1246 averages the value of the smooth 2D peaked function of step 1244 over the local region. Step 1246 is an embodiment of step 1046. In one embodiment, step 1246 averages the value of W(k) over all pixels in the local region, for each pixel of ghost mask 190. In this embodiment, the value of pixel (i,j) of ghost mask 190 may be written as $$W_{ij} = \frac{1}{n+1}\sum_{k=0}^{n} W_k = \frac{1}{n+1}\sum_{k=0}^{n} e^{-\left(\frac{(P_k^h-Q_k^h)^2}{2\cdot\sigma_h^2} + \frac{(P_k^v-Q_k^v)^2}{2\cdot\sigma_v^2}\right)}, \quad \text{(Eq. 3)}$$

wherein k is a running variable to sum over all pixels within the local region, and n+1 is the number of pixels in the local region. In one example of step 1246, function module 932 averages the value of the smooth peaked 2D function of step 1244 over the local region. Without departing from the scope hereof, step 1246 may further include dilating and/or normalizing ghost mask 190.

Optional step 1243 processes the rectified and aligned first and second images to determine parameters of the smooth peaked 2D function. Step 1243 is an embodiment of step 1043. Step 1243 may be performed separately for each pixel of ghost mask 190 or, without departing from the scope hereof, performed once to determine one or more parameters that apply to all pixels of ghost mask 190. In certain embodiments, optional step 1243 determines the values of $\sigma_h$ and $\sigma_v$. In one example of step 1243, parameter determinator 936 processes rectified and aligned images 662(1) and 662(2) to determine parameters of a smooth peaked 2D function implemented as smooth peaked function 920. For example, parameter determinator 936 may determine the values of $\sigma_h$ and $\sigma_v$.

Method 1200 may further include a step 1260 that performs one or both of (a) step 750 and (b) step 760 (and optionally step 770), as discussed above in reference to FIG. 7.

Figure 13:
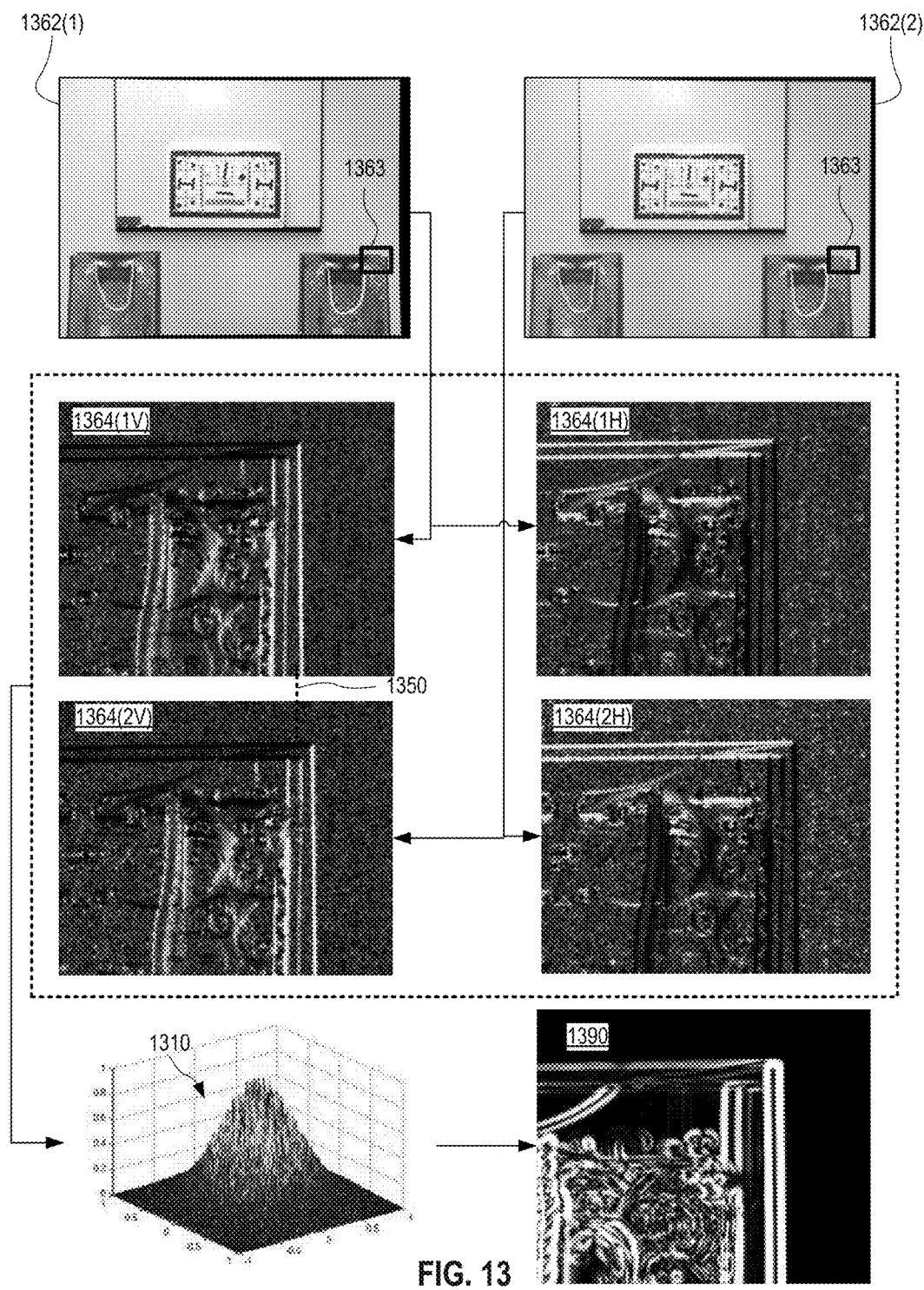
FIG. 13 illustrates exemplary processing of array camera images according to the method of FIG. 12, to determine a ghost mask.

FIG. 13 illustrates exemplary processing of array camera images according to method 1200, to determine a ghost mask 1390. Ghost mask 1390 is an example of ghost mask 190. In this example of method 1200, step 1230 receives rectified and aligned images 1362(1) and 1362(2) captured by an embodiment of cameras 130(1) and 130(2), respectively, as implemented in array camera 200. Rectified and aligned images 1362(1) and 1362(2) are examples of rectified and aligned images 662(1) and 662(2), respectively. Step 1230 processes rectified and aligned image 1362(1) to determine a vertical-feature image 1364(1V), which provides an enhanced view of vertically oriented features in rectified and aligned image 1362(1). For clarity of illustration, FIG. 13 shows only a portion of vertical-feature image 1364(1V) derived from an area 1363 of rectified and aligned image 1362(1). Similarly, step 1230 processes rectified and aligned image 1362(2) to determine a vertical-feature image 1364(2V), which provides an enhanced view of vertically oriented features in rectified and aligned image 1362(2). For clarity of illustration, FIG. 13 shows only a portion of vertical-feature image 1364(2V) derived from area 1363 of rectified and aligned image 1362(2). Step 1230 may implement step 1232 to apply a horizontal gradient filter, for example incorporating a Sobel operator, to rectified and aligned images 1362(1) and 1362(2) to determine vertical-feature images 1364(1V) and 1364(2V). Step 1230 processes rectified and aligned image 1362(1) to determine a horizontal-feature image 1364(1H), which provides an enhanced view of horizontally oriented features in rectified and aligned image 1362(1). For clarity of illustration, FIG. 13 shows only a portion of horizontal-feature image 1364(1H) derived from area 1363 of rectified and aligned image 1362(1). Similarly, step 1230 processes rectified and aligned image 1362(2) to determine a horizontal-feature image 1364(2H), which provides an enhanced view of horizontally oriented features in rectified and aligned image 1362(2). For clarity of illustration, FIG. 13 shows only a portion of horizontal-feature image 1364(2H) derived from area 1363 of rectified and aligned image 1362(2). Step 1230 may implement step 1234 to apply a vertical gradient filter, for example incorporating a Sobel operator, to rectified and aligned images 1362(1) and 1362(2) to determine horizontal-feature images 1364(1H) and 1364(2H).

It is apparent that features in vertical-feature image 1364(1) are offset from corresponding features in vertical-feature image 1364(2). For example, line 1350 is aligned with one feature in vertical-feature image 1364(1V) but is not aligned with the same feature in vertical-feature image 1364(2V).

Step 1244 applies a 2D Gaussian 1310, similar to that of Eq. 2, to vertical-feature image 1364(1V), vertical-feature image 1364(2V), horizontal-feature image 1364(1H), and horizontal-feature image 1364(2H). For each pixel of ghost mask 1390, step 1246 averages the value of 2D Gaussian 1310 over the local region associated with the pixel of ghost mask 1390 under consideration, for example according to Eq. 3. Step 1246 further applies dilation to ghost mask 1390 to produce the version of ghost mask 1390 shown in FIG. 13.

Figure 14:
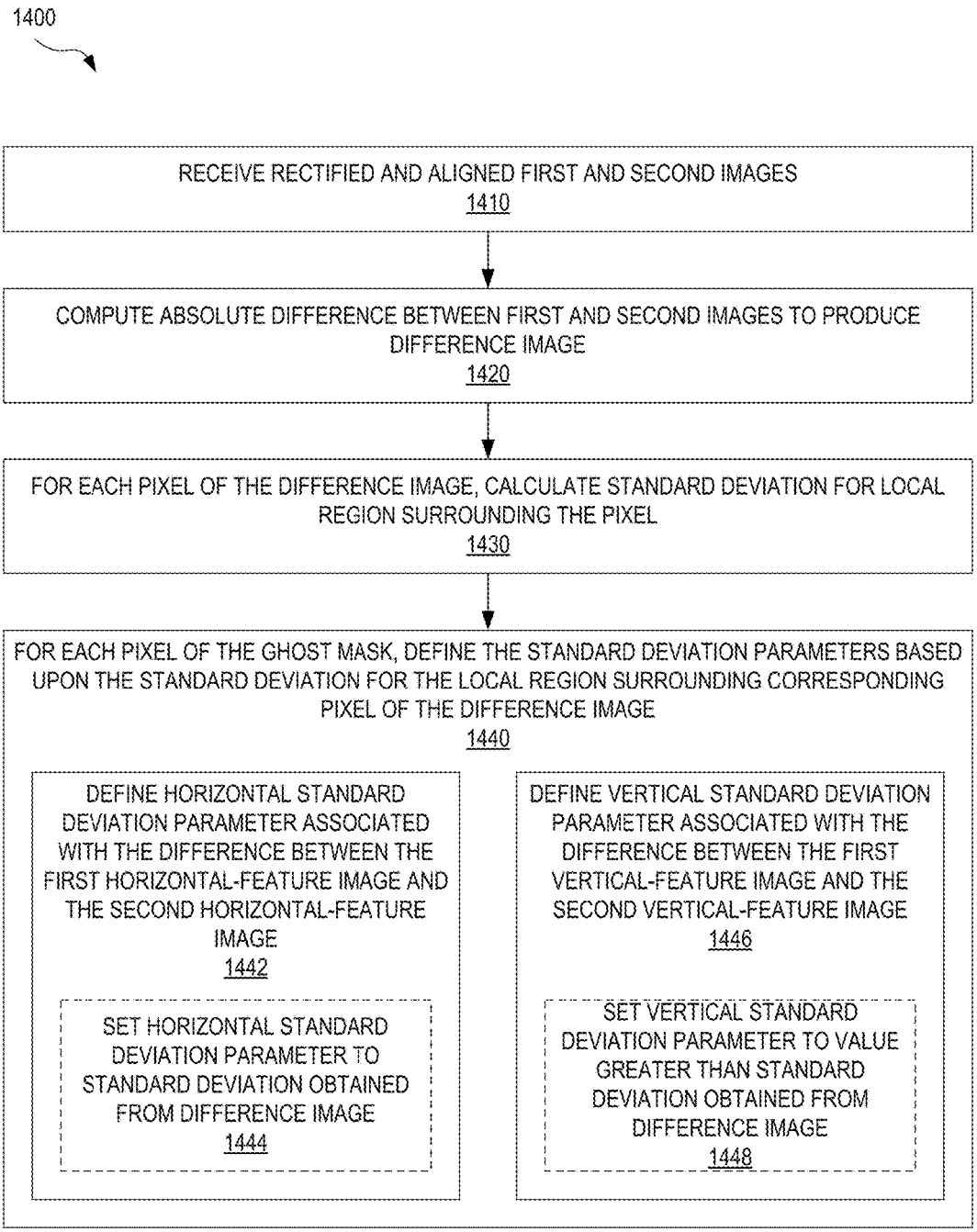
FIG. 14 illustrates a method for determining standard deviation parameters of a 2D Gaussian used to determine a ghost mask, according to an embodiment.

FIG. 14 illustrates one exemplary method 1400 for determining standard deviation parameters of the 2D Gaussian of Eq. 2. Method 1400 is an embodiment of step 1443 and may be performed by parameter determinator 936.

In a step 1410, method 1400 receives the rectified and aligned first and second images (based upon images captured by respective first and second cameras of an array camera). In one example of step 1410, parameter determinator 936 receives rectified and aligned images 662(1) and 662(2).

In a step 1420, method 1400 computes the absolute difference between the rectified first and second images to produce a difference image. Step 1420 may be performed by parameter determinator 936.

A step 1430 calculates, for each pixel of the difference image, the standard deviation for a local region surrounding the pixel. Step 1430 may be performed by parameter determinator 936.

For each pixel of ghost mask 190, a step 1440 defines the associated standard deviation parameters based upon the standard deviation determined in step 1430. Step 1440 may be performed by parameter determinator 936. Step 1440 includes steps 1442 and 1446. Steps 1442 and 1446 are performed for each pixel of ghost mask 190. Step 1442 defines the horizontal standard deviation parameter associated with difference between the first horizontal-feature image and the second horizontal-feature image, based upon the standard deviation determined in step 1430. Step 1446 defines the vertical standard deviation parameter associated with difference between the first vertical-feature image and the second vertical-feature image, based upon the standard deviation determined in step 1430. In one embodiment, steps 1442 and 1446 assign the same standard deviation parameter to difference associated with horizontal-feature images and difference associated with vertical-feature images. In another embodiment, steps 1442 and 1446 differ from each other such that a greater standard deviation parameter is assigned to difference associated with the vertical-feature images, to assign greater weight to horizontal features in step 1244. For example, step 1446 may include a step 1448 of setting the standard deviation parameter, associated with difference between the vertical-feature images, to the standard deviation obtained in step 1430; and step 1442 may include a step 1444 of setting the standard deviation parameter, associated with difference between the horizontal-feature images, to a value greater than the standard deviation obtained in step 1430, such as twice the value of the standard deviation obtained in step 1430. Parameter determinator 936 may perform step 1440.

Figure 15A:
FIGS. 15A and 15B illustrate capabilities of the method of FIG. 12, implementing the method of FIG. 14, according to an embodiment.
Figure 15B:

FIGS. 15A and 15B illustrate exemplary capabilities of method 1200, implementing method 1400. FIG. 15A is a portion of a combined image achieved using prior-art image combination technology based on purely geometrical corrections. FIG. 15B is a corresponding portion of a combined image achieved using image processing system 100, implementing ghost mask generator 930, according to an embodiment of method 1200. FIGS. 15A and 15B are best viewed together. The images of both of FIGS. 15A and 15B result from combination of images 1362(1) and 1362(2), and each of FIGS. 15A and 15B shows the portion of the combined image corresponding to area 1363.

FIG. 15B is produced using an embodiment of method 1200 that includes steps 760 and 770 and also implements method 1400 in step 1243. Method 1400 is implemented in step 1243 with the inclusion of steps 1444 and 1448, wherein the vertical standard deviation parameter of step 1448 is set to twice the value of the horizontal standard deviation parameter of step 1444. FIG. 15B utilizes ghost mask 1390 and is an exemplary output of step 770. The prior-art image of FIG. 15A suffers from ghost artifacts with essentially all features appearing in duplicate, while no such ghosts appear in the image of FIG. 15B, thus illustrating the capability of the presently disclosed methods and systems.

Figure 16:
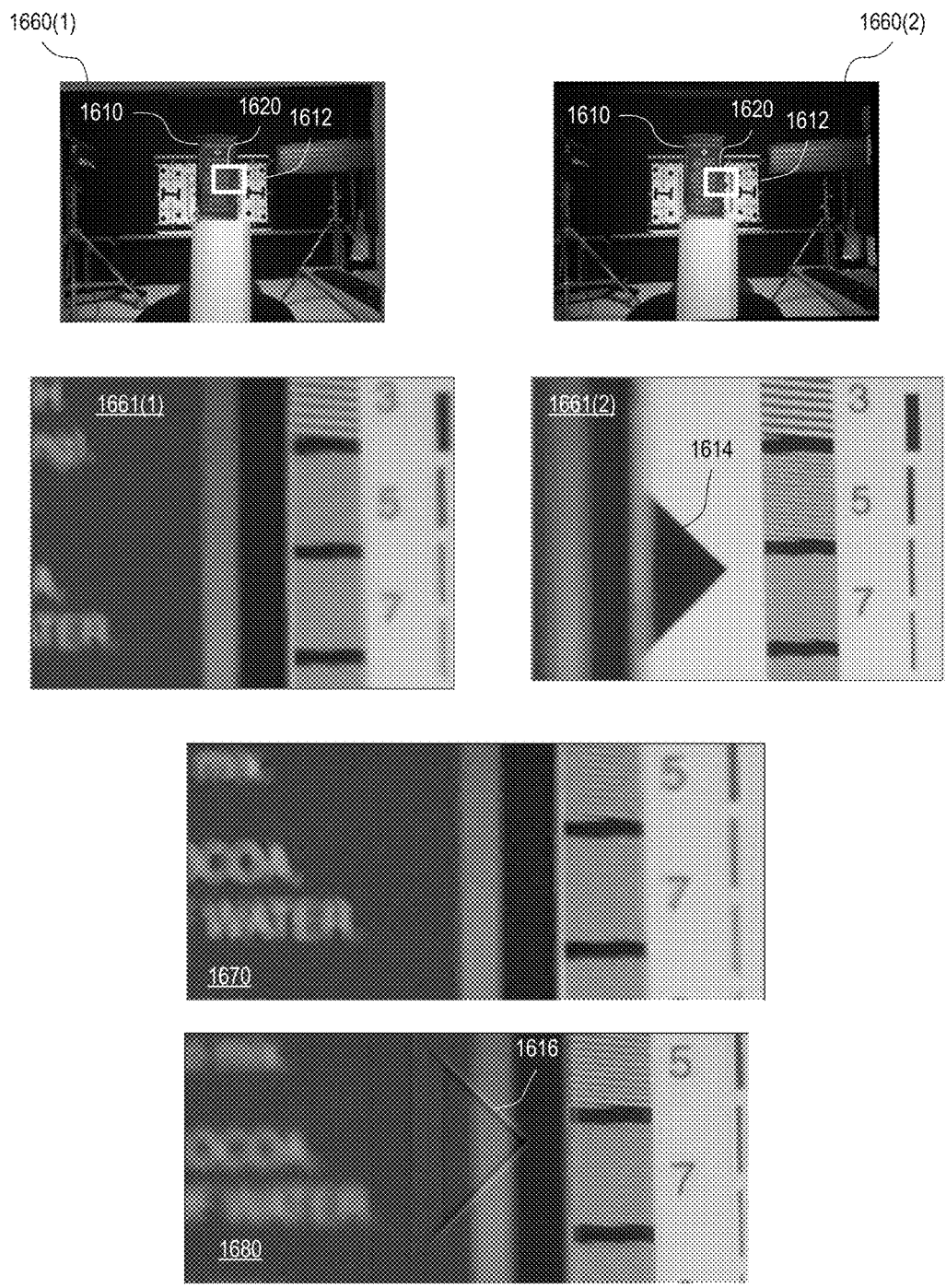
FIG. 16 illustrates capabilities of the method of FIG. 12 in regards to occlusions, according to an embodiment.

FIG. 16 illustrates exemplary capabilities of method 1200 in regards to occlusions. Two input images 1660(1) and 1660(2), examples of images 160(1) and 160(2), are combined according to the same embodiment of method 1200 as used above to obtain the combined image of FIG. 15B. Image 1670 is a portion of the resulting combined image. The scene imaged in images 1660(1) and 1660(2) includes a foreground object 1610 and a background object 1612. Foreground object 1610 partly obscures the view of background object 1612. Images 1661(1) and 1661(2) are close-ups of images 1660(1) and 1660(2). A background object 1614, which is a portion of background object 1613, is visible from the vantage point of the camera capturing image 1660(2) but, from the vantage point of the camera capturing image 1660(1), foreground object 1610 blocks the view of background object 1614. As a result, as evident from images 1661(1) and 1661(2), background object 1614 is visible in image 1660(2) but is occluded by foreground object 1610 in image 1660(1). In prior-art image combination based on purely geometrical corrections, this occlusion results in the occlusion ghost artifact illustrated in image 1680, wherein background object 1614 appears to be overlaid on foreground object 1610. However, as evident from image 1670, the combined image obtained using method 1200 is free of this occlusion ghost artifact.

FIG. 17 illustrates one exemplary method 1700 for combining array camera images with feature-based ghost removal, wherein one image is of higher quality within the FOV overlap between the cameras used to capture the images. Method 1700 is an embodiment of either one of methods 700 (optionally implementing method 1000) and 1200. In an exemplary use scenario, method 1700 is applied in image combination of images captured by array camera 420 or by array camera 520. Method 1700 may be performed by image processing system 100, or by camera device 102, wherein camera device 102 may implement array camera 420 or array camera 520.

In a step 1710 method 1700 performs steps 710, 720, and 730, and optionally one or both of steps 702 and 715, to generate (a) rectified and aligned first and second images and (b) corresponding first and second feature images, based upon first and second images from respective first and second cameras of an array camera, as discussed above in reference to FIG. 7. In method 1700, one of the first and second images is of higher quality within the FOV overlap between the first and second images.

A step 1740 compares the at least one first feature image with the at least one second feature image to determine ghost mask 190. Step 1740 is an embodiment of step 740. Step 1740 includes a step 1742 of determining ghost mask 190 such that the combination weights for the higher quality image increase with increasing difference between corresponding locations of features in the first and second feature images. Step 1742 biases combination of the first and second images to give more weight to the image of higher quality, when the same feature appears in different locations in the first and second images. In one example, image processing system 100 performs step 1740 as discussed above in reference to FIGS. 7A and 7C, however with the combination weights for the higher quality image increasing with increasing difference between corresponding locations of features in the first and second feature images. Step 1740 may include step 742 as discussed above in reference to FIG. 7. Step 742 may implement step 1042 or step 1242.

In one embodiment, method 1700 includes step 760 and, optionally, step 770. In another embodiment, method 1700 includes step 750. In yet another embodiment, method 1700 includes both step 750 and 760, and optionally also step 770.

Figure 18:
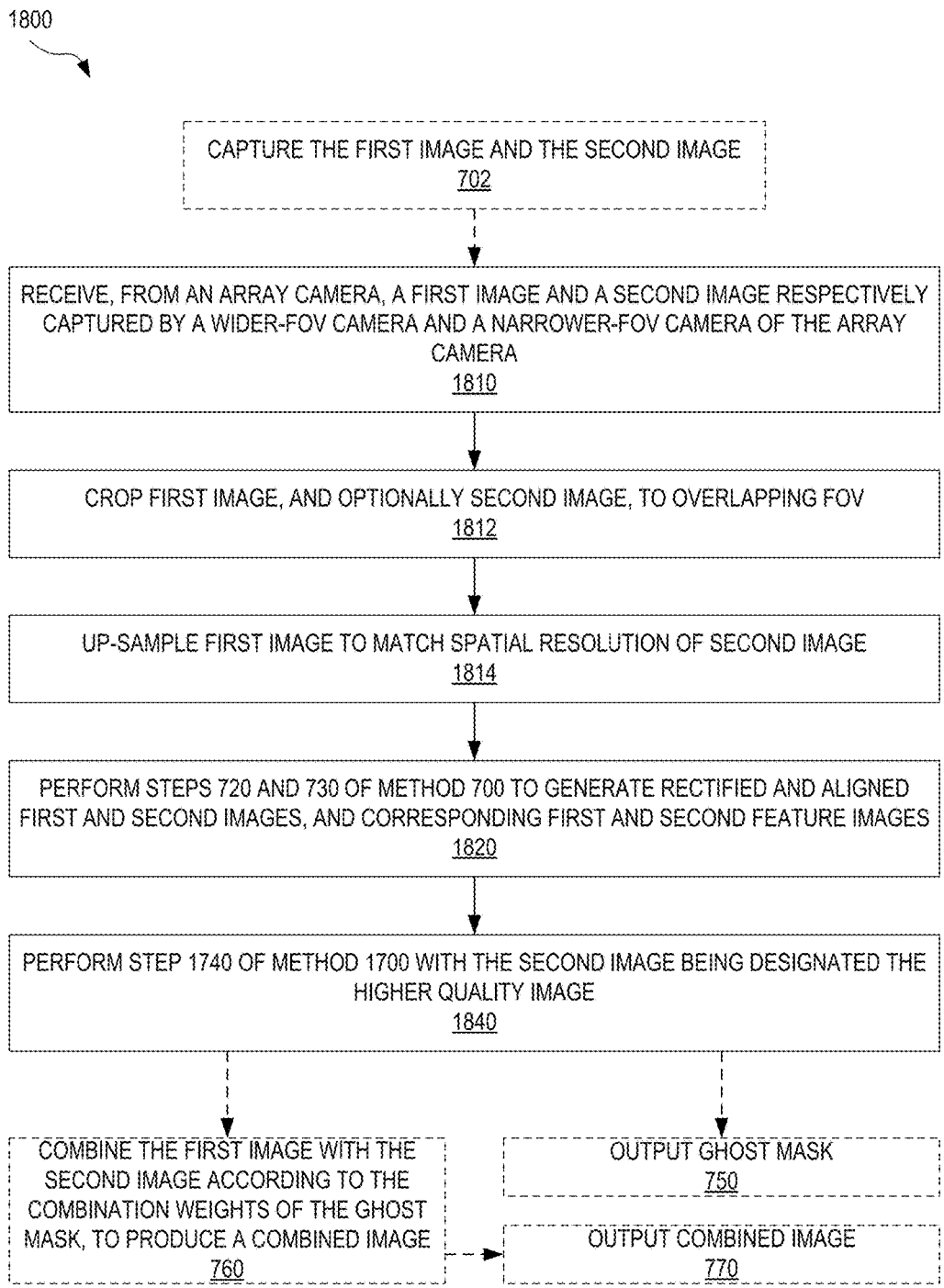
FIG. 18 illustrates a method, with feature-based ghost removal, for combining first and second images captured by a wider-FOV camera and a narrower-FOV camera, respectively, of an array camera, according to an embodiment.

FIG. 18 illustrates one exemplary method 1800, with feature-based ghost removal, for combining first and second images captured by a wider-FOV camera and a narrower-FOV camera, respectively, of an array camera. In one example, method 1800 is performed by image processing system 100 to determine ghost mask 190 for combination of images 160(1) and 160(2) captured by array camera 520. In another example, method 1800 is performed by camera device 102 implementing array camera 520. Method 1800 is an embodiment of method 1700.

A step 1810 receives a first image and a second image from an array camera. The first and second images have been captured by a wider-FOV camera and a narrower-FOV camera, respectively. Step 1810 is an embodiment of step 710. In one example of step 1810, image processing system 100 receives images 160(1) and 160(2) captured by wider-FOV camera 530(1) and narrower-FOV camera 530(2), respectively.

Optionally, step 1810 is preceded by step 702. In one example of step 702, as implemented in method 1800, wider-FOV camera 530(1) captures image 160(1) and narrower-FOV camera 530(2) captures image 160(2).

A step 1812 crops the first image, and optionally the second image, to include substantially only the FOV overlap therebetween. It is understood that, prior to image rectification and alignment and also in the presence of imperfections, the first and second images outputted by step 1812 may represent slightly different FOVs. In one example of step 1812, equalizer 650 crops image 160(1) captured by wider-FOV camera 530(1) to represent substantially the same FOV as captured by narrower-FOV camera 530(2) in image 160(2).

A step 1814 up-samples the first image to match the spatial resolution of the second image. Step 1814 compensates for the loss of pixels in cropping process applied to the first image in step 1812. After performing step 1814, the first and second images represent substantially the same FOV and have the same pixel resolution. In one example of step 1814, equalizer 650 up-samples the cropped version of image 160(1) captured by wider-FOV camera 530(1) to have the same pixel resolution as image 160(2) captured by narrower-FOV camera 530(2) after processing in step 1812. Steps 1812 and 1814 cooperate to form an embodiment of step 715.

In a step 1820, method 1800 performs steps 720 and 730 to generate (a) rectified and aligned first and second images based upon the first and second images as processed in steps 1812 and 1814 and (b) corresponding first and second feature images. A step 1840 performs step 1740 with the second image being designated the higher quality image.

In one embodiment, method 1800 includes step 760 and, optionally, step 770. In another embodiment, method 1800 includes step 750. In yet another embodiment, method 1800 includes both step 750 and 760, and optionally also step 770.

Figure 19:
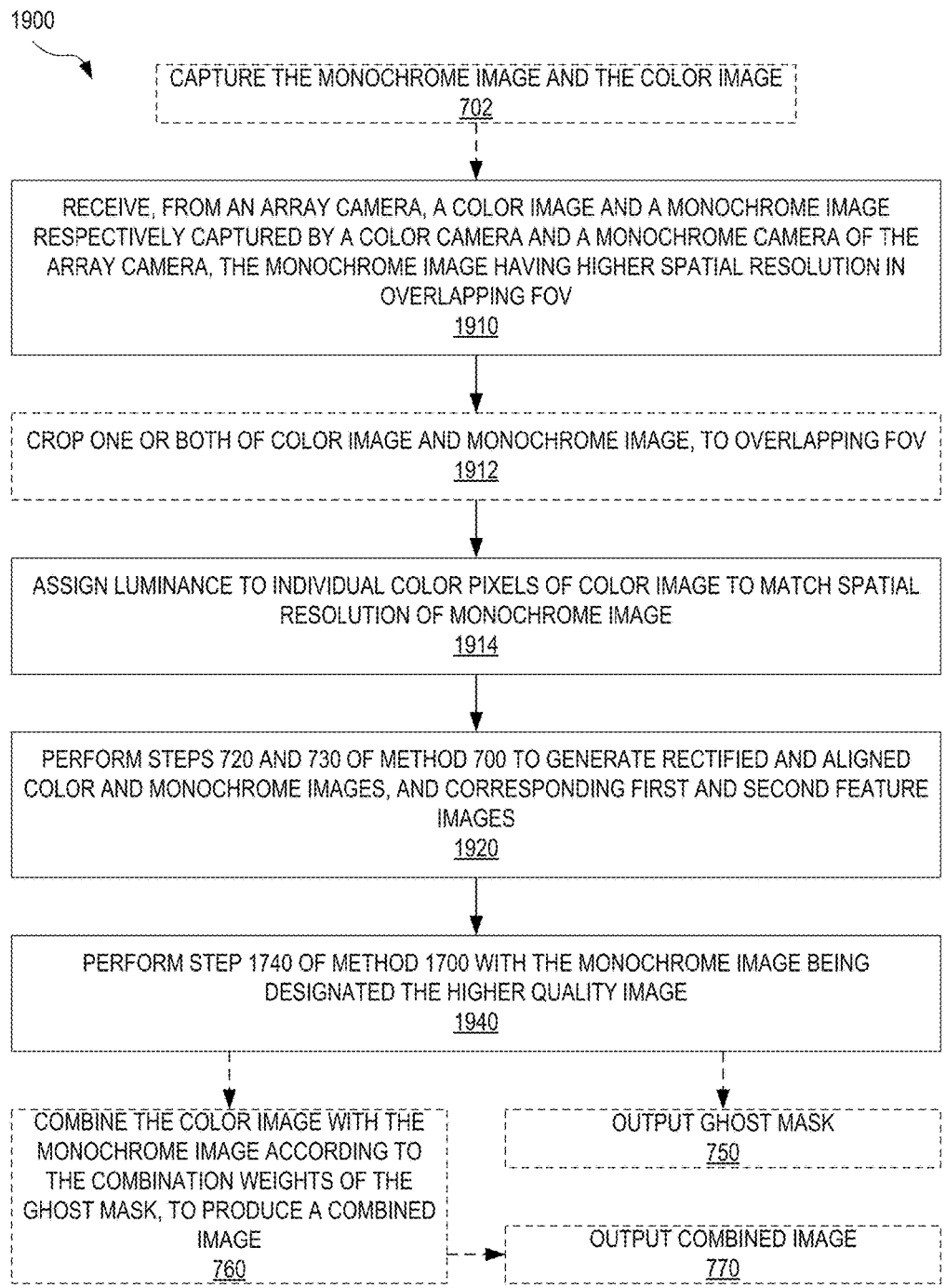
FIG. 19 illustrates a method, with feature-based ghost removal, for combining a color image and a monochrome image captured by a color camera and a monochrome camera, respectively, of an array camera, according to an embodiment.

FIG. 19 illustrates one exemplary method 1900, with feature-based ghost removal, for combining a color image and a monochrome image captured by a color camera and a monochrome camera, respectively, of an array camera. In one example, method 1900 is performed by image processing system 100 to determine ghost mask 190 for combination of images 160(1) and 160(2) captured by array camera 420. In another example, method 1900 is performed by camera device 102 implementing array camera 420. Method 1900 is an embodiment of method 1700.

A step 1910 receives a first image and a second image from an array camera. The first image is a color image and the second image is a monochrome image. The first and second images have been captured by a color camera and a monochrome camera, respectively, of an array camera. Step 1910 is an embodiment of step 710. In one example of step 1910, image processing system 100 receives images 160(1) and 160(2) captured by color camera 430(1) and monochrome camera 430(2), respectively.

Optionally, step 1910 is preceded by step 702. In one example of step 702, as implemented in method 1900, color camera 430(1) captures image 160(1) and monochrome camera 430(2) captures image 160(2).

An optional step 1912 crops one or both of the first and second images to include substantially only the FOV overlap therebetween. It is understood that, prior to image rectification and alignment and also in the presence of imperfections, the first and second images resulting from processing in step 1912 may represent slightly different FOVs. In one example of step 1912, equalizer 650 crops one or both of image 160(1) captured by color camera 430(1) and image 160(2) captured by monochrome camera 430(2) to represent substantially the same FOV.

A step 1914 assigns luminance to individual color pixels of the first image to match the spatial resolution of the second (monochrome) image. For example, if the first image is composed of 2×2 color pixel groups, such as a red, a blue, and two green color pixels, each of the individual color pixels within each such 2×2 color pixel group may be assigned the luminance detected with combining the light received in all of the individual color pixels in the 2×2 color pixel group. In one embodiment, the number of color pixels in the first image matches the number of pixels in the second (monochrome) image. In this embodiment, it is sufficient to assign the luminance detected by each color pixel group of the first image to each color pixel within the group. In another embodiment, the number of color pixels in the first image is less than the number of pixels in the second (monochrome) image. In this embodiment, step 1914 further up-samples the first image to match the pixel resolution of the second image after luminance assignment to the first image. In yet another embodiment, the number of color pixels in the first image is greater than the number of pixels in the second (monochrome) image. In this embodiment, step 1914 may down-sample the first image or up-sample the second image to produce the same pixel resolution for the first image and the second image after luminance assignment to the first image. After performing step 1914, the first image and second image represent substantially the same FOV and have the same monochrome format, including the same pixel resolution. In one example of step 1914, equalizer 650 assigns luminance to image 160(1) captured by color camera 430(1), and optionally modifies the pixel resolution of one or both of image 160(1) captured by color camera 430(1) and image 160(2) captured by monochrome camera 430(2), such that image 160(1) and image 160(2) have same monochrome format, have same pixel resolution, and represent substantially the same FOV. Step 1914, optionally in cooperation with step 1912, forms an embodiment of step 715.

In a step 1920, method 1900 performs steps 720 and 730 to generate (a) rectified and aligned first and second images based upon the first and second images after completion of step 1914 and (b) corresponding first and second feature images. A step 1940 performs step 1740 with the second (monochrome) image being designated the higher quality image.

In one embodiment, method 1900 includes step 760 and, optionally, step 770. In another embodiment, method 1900 includes step 750. In yet another embodiment, method 1900 includes both step 750 and 760, and optionally also step 770.

Figure 20:
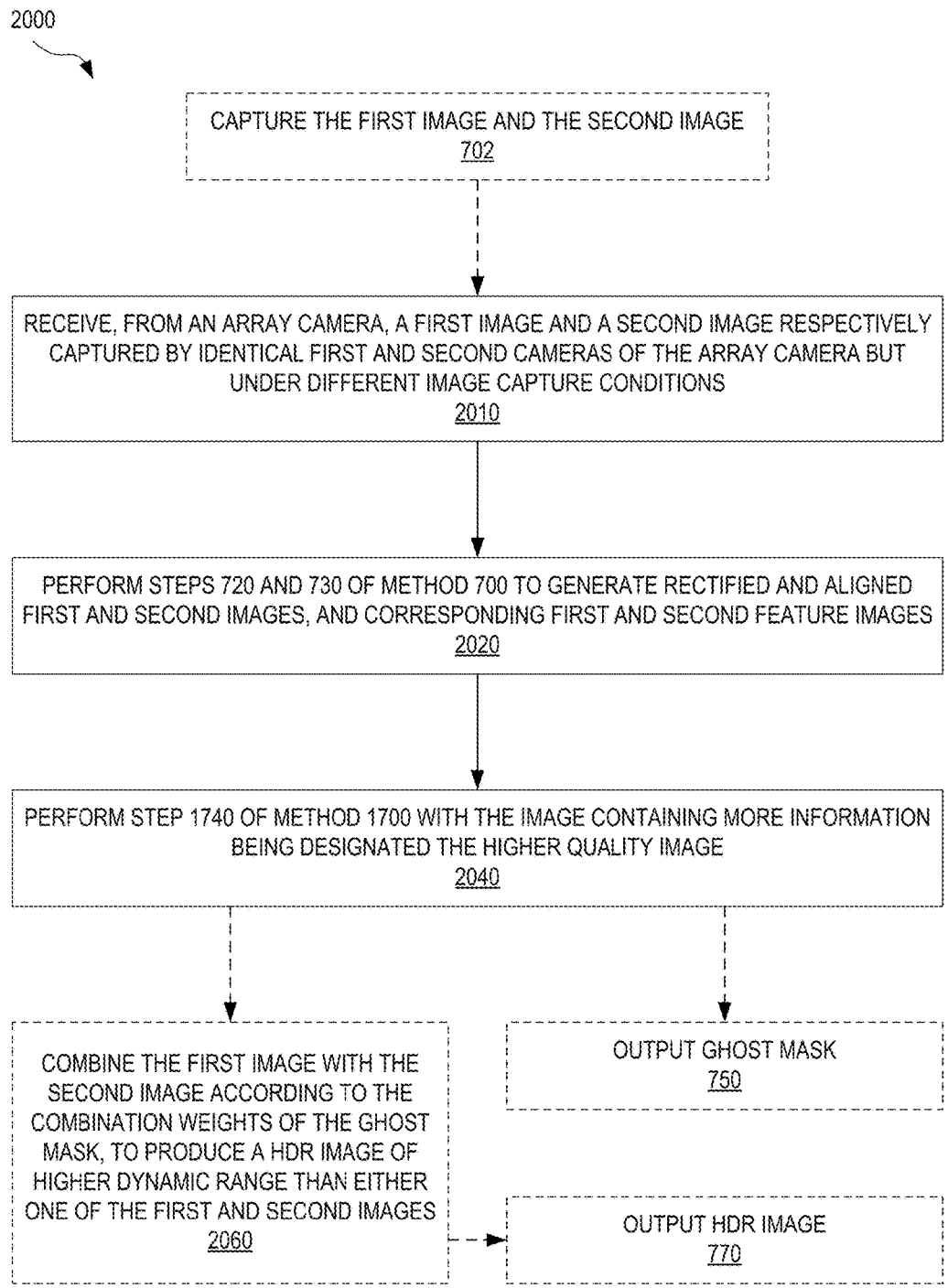
FIG. 20 illustrates a method for combining images captured by an array camera to produce an HDR image, with feature-based ghost removal, according to an embodiment.

FIG. 20 illustrates one exemplary method 2000 for combining images captured by an array camera to produce an HDR image, with feature-based ghost removal. In one example, method 2000 is performed by image processing system 100 to determine ghost mask 190 for combination of images 160(1) and 160(2) captured by array camera 320. In another example, method 2000 is performed by camera device 102 implementing array camera 320. Method 2000 is an embodiment of method 1700.

A step 2010 receives a first image and a second image captured by respective first and second cameras of an array camera. The first and second cameras produce images of same format, including same pixel resolution. However, the first and second images are captured under different conditions to produce images of different brightnesses. In one example, the first and second images are captured at different exposure times. In another example, the first and second images are captured with different camera gains. In yet another example, the first and second images are captured at different exposure times and different camera gains. Step 2010 is an embodiment of step 710. In one example of step 2010, image processing system 100 receives images 160(1) and 160(2) captured by camera 330(1) and camera 330(2), respectively.

Optionally, step 2010 is preceded by step 702. In one example of step 702, as implemented in method 2000, camera 330(1) captures image 160(1) and camera 330(2) captures image 160(2). Step 702, as implemented in method 2000, may capture the first and second images at substantially the same time, so as to eliminate or minimize artifacts caused by motion in the scene between capture of the first and second images.

A step 2020 performs steps 720 and 730 to generate (a) rectified and aligned first and second images and (b) corresponding first and second feature images. A step 2040 performs step 1740 with the image containing more information being designated the higher quality image.

In one embodiment, method 2000 includes step 760 to generate a HDR image and, optionally, step 770. In another embodiment, method 2000 includes step 750. In yet another embodiment, method 2000 includes both step 750 and 760, and optionally also step 770.

Figure 21:
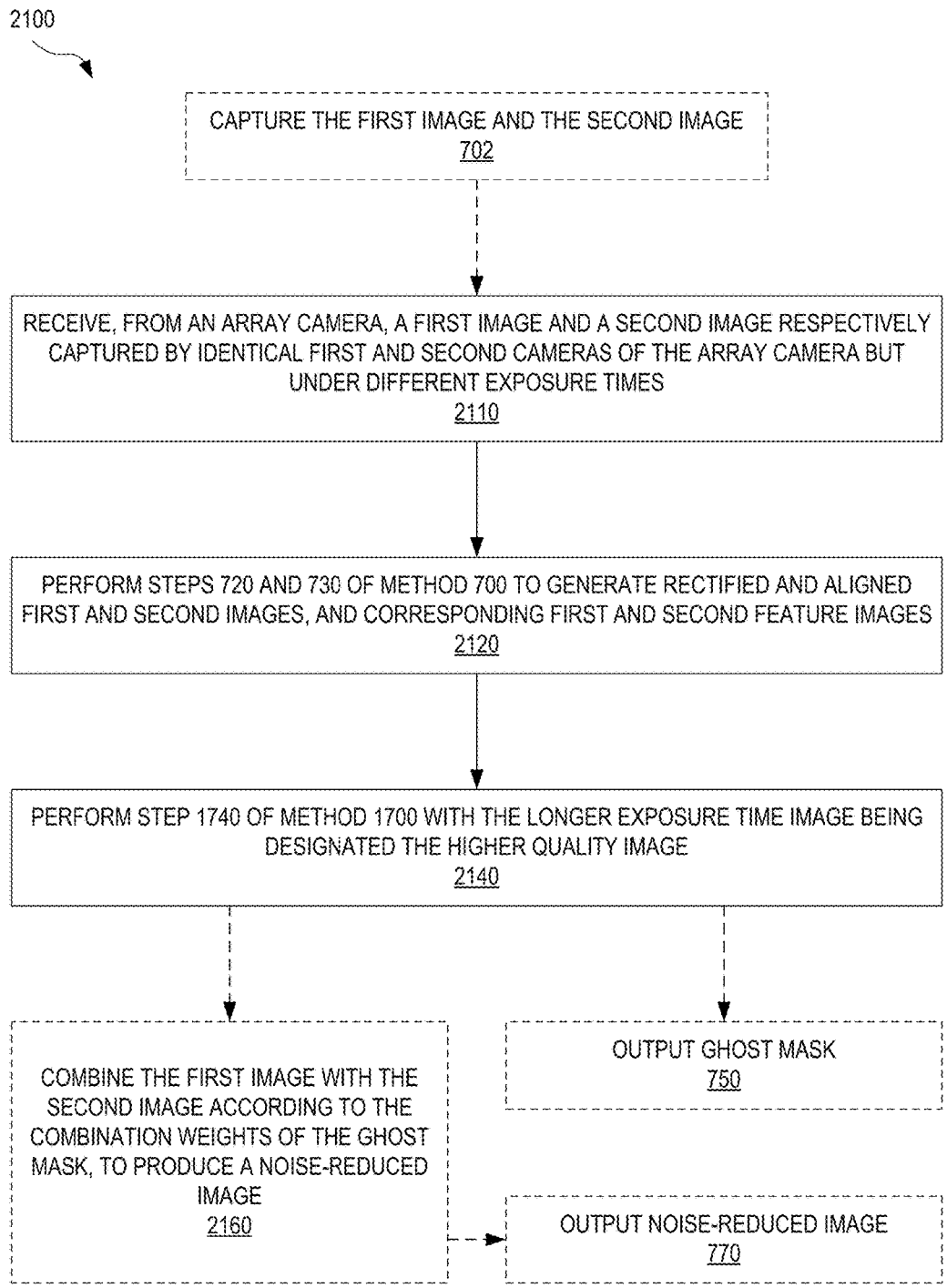
FIG. 21 illustrates a method for combining images captured by an array camera to produce an noise-reduced image, with feature-based ghost removal, according to an embodiment.

FIG. 21 illustrates one exemplary method 2100 for combining images captured by an array camera to produce a noise-reduced image, with feature-based ghost removal. In one example, method 2100 is performed by image processing system 100 to determine ghost mask 190 for combination of images 160(1) and 160(2) captured by array camera 320. In another example, method 2100 is performed by camera device 102 implementing array camera 320. Method 2100 is an embodiment of method 1700.

A step 2110 receives a first image and a second image captured by respective first and second cameras of an array camera. The first and second cameras produce images of same format, including same pixel resolution. However, the first and second images are captured under different exposure times to produce images of different brightnesses and noise properties. Step 2110 is an embodiment of step 710. In one example of step 2110, image processing system 100 receives images 160(1) and 160(2) captured by camera 330(1) and camera 330(2), respectively.

Optionally, step 2110 is preceded by step 702. In one example of step 702, as implemented in method 2100, camera 330(1) captures image 160(1) and camera 330(2) captures image 160(2). Step 702, as implemented in method 2100, may capture the first and second images at substantially the same time, so as to eliminate or minimize artifacts caused by motion in the scene between capture of the first and second images.

A step 2120 performs steps 720 and 730 to generate (a) rectified and aligned first and second images and (b) corresponding first and second feature images. A step 2140 performs step 1740 with the longer exposure time image being designated the higher quality image.

In one embodiment, method 2100 includes step 760 to generate a noise-reduced image and, optionally, step 770. In another embodiment, method 2100 includes step 750. In yet another embodiment, method 2100 includes both step 750 and 760, and optionally also step 770.

Combinations of Features

Features described above as well as those claimed below may be combined in various ways without departing from the scope hereof. For example, it will be appreciated that aspects of one array image combination system or method with feature-based ghost removal, described herein, may incorporate or swap features of another image processing system or method with feature-based ghost removal described herein. The following examples illustrate possible, non-limiting combinations of embodiments described above. It should be clear that many other changes and modifications may be made to the methods and device herein without departing from the spirit and scope of this invention:

(A1) A method for combining array camera images with feature-based ghost removal may include steps of (a) receiving, from an array camera, a first image and a second image respectively captured by a first camera and a second camera of the array camera, (b) rectifying and aligning the first image and the second image, (c) after said rectifying and aligning, identifying features in the first image to produce at least one first feature image each indicating features in the first image, and identifying features in the second image to produce at least one second feature image each indicating features in the second image, and (d) comparing the at least one first feature image with the at least one second feature image to determine a ghost mask defining combination weights for combination of the first image with the second image.

(A2) The method denoted as (A1) may further include using a processor to execute machine-readable instructions encoded in non-transient memory to perform each of the steps of rectifying and aligning, said identifying, and said comparing.

(A3) Either or both of the methods denoted as (A1) and (A2) may further include a step of combining the first image with the second image according to the combination weights of the ghost mask, to produce a combined image with reduced ghost artifacts.

(A4) Any of the methods denoted as (A1) through (A3) may further include, prior to the step of comparing, a step of processing at least one of the first image and the second image such that the first image and the second image have substantially the same field of view and same format.

(A5) Any of the methods denoted as (A1) through (A4) may include (1) in the step of identifying, a step of filtering the first image to generate the least one first feature image, and filtering the second image to generate the least one second feature image, and (2) in the step of comparing, a step of calculating value of each pixel of the ghost mask from differences between the at least one first feature image and the at least one second feature image in a local region surrounding the pixel of the ghost mask.

(A6) In the method denoted as (A5), the step of calculating may include a step of, for each pixel in the local region, applying a smooth function to a measure of difference between the at least one first feature image and the at least one second feature image at the pixel in the local region, wherein the smooth function (i) has a single peak that is attained when the measure is zero and (ii) decreases with increasing value of the measure, and a step of averaging value of the smooth function over the local region.

(A7) In the method denoted as (A6), in the step of applying, the measure of the difference may be weighted according to the statistical significance of the difference.

(A8) In either or both of the methods denoted as (A6) and (A7), in the step of applying, the smooth function may be a two-dimensional Gaussian function.

(A9) Any of the methods denoted as (A6) through (A8) may include, in the step of filtering, steps of (a) filtering the first image to generate a first vertical-feature image indicating vertically oriented features in the first image, (b) filtering the first image to generate a first horizontal-feature image indicating horizontally oriented features in the first image, (c) filtering the second image to generate a second vertical-feature image indicating vertically oriented features in the second image, and (d) filtering the second image to generate a second horizontal-feature image indicating horizontally oriented features in the second image; and in the step of applying, a step of applying the smooth function to a two-dimensional measure including the difference between the first vertical-feature image and the second vertical-feature image and the difference between the first horizontal-feature image and the second horizontal-feature image.

(A10) In the method denoted as (A9), the step of applying may include a step of applying a two-dimensional Gaussian function to the difference between the first vertical-feature image and the second vertical-feature image and the difference between the first horizontal-feature image and the second horizontal-feature image.

(A11) The method denoted as (A10) may further include a step of processing the first image and the second image to determine standard deviation parameters of the two-dimensional Gaussian function.

(A12) In the method denoted as (A11), the step of processing may include, after said rectifying and aligning, steps of (i) computing a difference image between the first and second images, (ii) for each pixel of the difference image, calculating standard deviation for local region surrounding the pixel, and (iii) for each pixel of the ghost mask, defining the standard deviation parameters based upon the standard deviation for the local region surrounding corresponding pixel of the difference image.

(A13) In the method denoted as (A12), the image sensor of the first camera and image sensor the second camera may be offset from each other in a horizontal dimension only, and the step of defining standard deviation parameters may include increasing standard deviation parameter associated with the measure of the difference between the first vertical-feature image and the second vertical-feature image, as compared to standard deviation parameter associated with the measure of the difference between the first horizontal-feature image and the second horizontal-feature image.

(A14) In any of the methods denoted as (A1) through (A13), the image sensor of the first camera and image sensor the second camera may be offset from each other in a horizontal dimension only, and the method may include (A) in the step of identifying and in each of the first image and the second image, identifying vertically oriented features in the first image to produce a first vertical-feature image, identifying horizontally oriented features in the first image to produce a first horizontal-feature image, identifying vertically oriented features in the second image to produce a second vertical-feature image, and identifying horizontally oriented features in the second image to produce a second horizontal-feature image, and (B) in the step of comparing, assigning greater weight to the first and second vertically oriented feature images than the first and second horizontal-feature images, to optimize the ghost mask for removal of ghost artifacts caused by the offset.

(A15) In any of the methods denoted as (A1) through (A14), the first image may have higher spatial resolution than the second image within field-of-view overlap between the first image and the second image, and the step of comparing may include determining the ghost mask such that the combination weights for the first image increase with increasing difference between locations of the features in the first feature image and locations of the features in the second feature image.

(A16) In the method denoted as (A15), the first image may be a monochrome image, the second image may be a color image of lower spatial resolution than the monochrome image, the first image and the second image may have substantially identically sized field of view, and the step of comparing may include determining the ghost mask such that the combination weights for the monochrome image increase with increasing difference between the locations of the features in the monochrome image with the locations of the features in the color image.

(A17) In the method denoted as (A15), the first camera and the second camera may have substantially identical pixel resolution, the first camera may have a first field of view, and the second camera may have a second field of view that is greater than the first field of view.

(A18) In the method denoted as (A15), the first camera may be substantially identical to the second camera, and at least one of exposure time and gain for the first image may be greater than exposure time and gain, respectively, for the second image.

(B1) A system for combining array camera images with feature-based ghost removal may include a processor and memory communicatively coupled with the processor and including machine-readable instructions configured to, upon execution by the processor, process a first image and a second image to determine a ghost mask defining combination weights for combining the first image with the second image, wherein the machine-readable instructions include (a) geometric correction instructions that, upon execution by the processor, rectify and align the first image and the second image, (b) feature identification instructions that, upon execution by the processor and execution of the geometric correction instructions, identify features in the first image to produce at least one first feature image each indicating features in the first image, and identify features in the second image to produce at least one second feature image each indicating features in the second image, and (c) ghost mask generation instructions that, upon execution by the processor, compare the at least one first feature image with the at least one second feature image to determine the ghost mask.

(B2) The system denoted as (B1) may further include the array camera such that the processor is communicatively coupled with the array camera.

(B3) The system denoted as (B2) may further include a smartphone, wherein each of the array camera, the processor, and the memory is implemented onboard the smartphone.

(B4) In any of the systems denoted as (B1) through (B3), the machine-readable instructions may further include combination instructions that, upon execution by the processor, combine the first image with the second image according to the combination weights of the ghost mask, to produce a combined image with reduced ghost artifacts after execution of the geometric correction instructions, of the first image and the second image.

(B5) The system denoted as (B4) may further include an interface for outputting the combined image.

(B6) In any of the systems denoted as (B1) through (B5), the machine-readable instructions may further include equalizing instructions that, upon execution by the processor and prior to said comparing, process at least one of the first image and the second image such that the first image and the second image have substantially same field of view and same format.

(B7) In any of the systems denoted as (B1) through (B6), the feature identification instructions may include filter instructions that, upon execution by the processor, filter (i) the first image to generate the least one first feature image and (ii) the second image to generate the least one second feature image, and the ghost mask generation instructions may be configured to, upon execution by the processor, calculate the value of each pixel of the ghost mask from a measure of difference between the at least one first feature image and the at least one second feature image in local region surrounding the pixel of ghost mask.

(B8) In the system denoted as (B7), the ghost mask generation instructions may include (i) a smooth function having a single peak that is attained when the measure is zero and decreasing with increasing value of the measure, (ii) function instructions that, upon execution by the processor, for each pixel in the local region, apply the smooth function to a measure of difference between the at least one first feature image and the at least one second feature image at the pixel in the local region, and (iii) averaging instructions that, upon execution by the processor, average the value of the smooth function over the local region.

(B9) In the system denoted as (B8), the measure may be the difference between the at least one first feature image and the at least one second feature image weighted according to statistical significance thereof.

(B10) In either or both of the systems denoted as (B8) and (B9), the smooth function may be a two-dimensional Gaussian function.

(B11) In any of the systems denoted as (B7) through (B10), the filter instructions may be configured to, upon execution by the processor, filter (1) the first image to generate a first vertical-feature image indicating vertically oriented features in the first image, (2) the first image to generate a first horizontal-feature image indicating horizontally oriented features in the first image, (3) the second image to generate a second vertical-feature image indicating vertically oriented features in the second image, and (4) the second image to generate a second horizontal-feature image indicating horizontally oriented features in the second image; and the measure may be a two-dimensional measure including (1) difference between the first vertical-feature image and the second vertical-feature image and (2) difference between the first horizontal-feature image and the second horizontal-feature image.

(B12) In the system denoted as (B11), the smooth function may be a two-dimensional Gaussian function, the function instructions may be configured to, upon execution by the processor, apply the two-dimensional Gaussian function to (a) difference between the first vertical-feature image and the second vertical-feature image and (b) difference between the first horizontal-feature image and the second horizontal-feature image.

(B13) In the system denoted as (B12), the ghost mask generation instructions may further include parameter instructions that, upon execution by the processor, process the first image and the second image to determine standard deviation parameters of the two-dimensional Gaussian function.

(B14) In the system denoted as (B13), the parameter instructions may be configured to (A) after rectifying and aligning, compute difference image between the first and second images, (B) for each pixel of the difference image, calculate standard deviation for local region surrounding the pixel, and (C) for each pixel of the ghost mask, define the standard deviation parameters based upon the standard deviation for the local region surrounding corresponding pixel of the difference image.

(B15) The system denoted as (B14) may further include the array camera, the processor may be communicatively coupled with the array camera, the image sensor of the first camera and image sensor the second camera may be offset from each other in a horizontal dimension only, and the parameter instructions may be configured to, upon execution by the processor, increase standard deviation parameters associated with the difference between the first vertical-feature image and the second vertical-feature image, as compared to standard deviation parameters associated with the difference between the first horizontal-feature image and the second horizontal-feature image, to optimize the ghost mask for removal of ghost artifacts caused by said offset.

(B16) Any of the systems denoted as (B1) through (B15) may further include the array camera, the processor may be communicatively coupled with the array camera, the image sensor of the first camera and image sensor the second camera may be offset from each other in a horizontal dimension only, the feature identification instructions may be configured to, upon execution by the processor, in each of the first image and the second image, identify (i) vertically oriented features in the first image to produce a first vertical-feature image, (ii) horizontally oriented features in the first image to produce a first horizontal-feature image, (iii) vertically oriented features in the second image to produce a second vertical-feature image, and (iv) horizontally oriented features in the second image to produce a second horizontal-feature image, and the ghost mask generation instructions may be configured to, upon execution by the processor, assign greater weight to the first and second vertically oriented feature images than the first and second horizontally oriented feature images, to optimize the ghost mask for removal of ghost artifacts caused by said offset.

(B17) In any of the systems denoted as (B1) through (B16), the first image may have higher spatial resolution within a field-of-view overlap between the first image and the second image, and the ghost mask generation instructions may be configured to, upon execution by the processor, determine the ghost mask such that the combination weights for the first image increase with increasing difference between locations of the features in the first feature image and locations of the features in the second feature image.

(B18) In the system denoted as (B17), the first image may be a monochrome image, the second image may be a color image of lower spatial resolution than the monochrome image, the first image and the second image may have substantially identically sized field of view, and the ghost mask generation may be configured to, upon execution by the processor, determine the ghost mask such that the combination weights for the monochrome image increase with increasing difference between the locations of the features in the monochrome image with the locations of the features in the color image.

(B19) The system denoted as (B18) may further include the array camera, the first camera and the second camera may have substantially identical pixel resolution, the first camera may have a first field of view, and the second camera may have a second field of view that is greater than the first field of view.

(B20) Any of the systems denoted as (B1) through (B17) may further include the array camera, the first camera may be substantially identical to the second camera, and at least one of exposure time and gain for the first image may be greater than exposure time and gain, respectively, for the second image.

Changes may be made in the above systems and methods without departing from the scope hereof. It should thus be noted that the matter contained in the above description and shown in the accompanying drawings should be interpreted as illustrative and not in a limiting sense. The following claims are intended to cover generic and specific features described herein, as well as all statements of the scope of the present methods and systems, which, as a matter of language, might be said to fall therebetween.

What is claimed is:

1. A method for combining array camera images with feature-based ghost removal, comprising:
    receiving, from an array camera, a first image and a second image respectively captured by a first camera and a second camera of the array camera;
    rectifying and aligning the first image and the second image;
    after said rectifying and aligning, identifying features in the first image to produce at least one first feature image each indicating features in the first image, and identifying features in the second image to produce at least one second feature image each indicating features in the second image, said identifying including filtering the first image to generate the at least one first feature image, and filtering the second image to generate the at least one second feature image;
    comparing the at least one first feature image with the at least one second feature image to determine a ghost mask defining combination weights for combination of the first image with the second image, said comparing including for each pixel of the ghost mask:
        (a) for each pixel in a local region surrounding the pixel of the ghost mask, applying a smooth function to a measure of difference between the at least one first feature image and the at least one second feature image at the pixel in the local region, the smooth function (i) having a single peak that is attained when the measure is zero and (ii) decreasing with increasing value of the measure, and
        (b) setting value of the pixel in the ghost mask to average value of the smooth function over the local region.

2. The method of claim 1, further comprising:
    combining the first image with the second image according to the combination weights of the ghost mask, to produce a combined image with reduced ghost artifacts.

3. The method of claim 1, further comprising, prior to said comparing, processing at least one of the first image and the second image such that the first image and the second image have substantially same field of view and same format.

4. The method of claim 1, in the step of applying, the measure of the difference being weighted according to statistical significance of the difference.

5. The method of claim 1, in the step of applying, the smooth function being a two-dimensional Gaussian function.

6. The method of claim 1, comprising:
    in the step of filtering:
        (a) filtering the first image to generate a first vertical-feature image indicating vertically oriented features in the first image,
        (b) filtering the first image to generate a first horizontal-feature image indicating horizontally oriented features in the first image,
        (c) filtering the second image to generate a second vertical-feature image indicating vertically oriented features in the second image, and
        (d) filtering the second image to generate a second horizontal-feature image indicating horizontally oriented features in the second image; and
    in the step of applying, applying the smooth function to a two-dimensional measure including (a) difference between the first vertical-feature image and the second vertical-feature image and (b) difference between the first horizontal-feature image and the second horizontal-feature image.

7. The method of claim 6, the step of applying comprising:
    applying a two-dimensional Gaussian function to (a) difference between the first vertical-feature image and the second vertical-feature image and (b) difference between the first horizontal-feature image and the second horizontal-feature image.

8. The method of claim 7, further comprising processing the first image and the second image to determine standard deviation parameters of the two-dimensional Gaussian function.

9. The method of claim 8, the step of processing comprising:
    after said rectifying and aligning, computing difference image between the first and second images;
    for each pixel of the difference image, calculating standard deviation for local region surrounding the pixel; and
    for each pixel of the ghost mask, defining the standard deviation parameters based upon the standard deviation for the local region surrounding corresponding pixel of the difference image.

10. The method of claim 9, the image sensor of the first camera and image sensor the second camera being offset from each other in horizontal dimension only, the step of defining standard deviation parameters comprising:
    increasing standard deviation parameter associated with the measure of the difference between the first vertical-feature image and the second vertical-feature image, as compared to standard deviation parameter associated with the measure of the difference between the first horizontal-feature image and the second horizontal-feature image.

11. The method of claim 1, the image sensor of the first camera and image sensor the second camera being offset from each other in horizontal dimension only, the method comprising:
- in the step of identifying and in each of the first image and the second image, identifying vertically oriented features in the first image to produce a first vertical-feature image, identifying horizontally oriented features in the first image to produce a first horizontal-feature image, identifying vertically oriented features in the second image to produce a second vertical-feature image, and identifying horizontally oriented features in the second image to produce a second horizontal-feature image; and
- in the step of comparing, assigning greater weight to the first and second vertically oriented feature images than the first and second horizontal-feature images, to optimize the ghost mask for removal of ghost artifacts caused by said offset.

12. The method of claim 1, the first image having higher spatial resolution than the second image within field-of-view overlap between the first image and the second image, the step of comparing comprising:
- determining the ghost mask such that the combination weights for the first image increase with increasing difference between locations of the features in the first feature image and locations of the features in the second feature image.

13. The method of claim 12, the first image being a monochrome image, the second image being a color image of lower spatial resolution than the monochrome image, the first image and the second image having substantially identically sized field of view, the step of comparing comprising:
- determining the ghost mask such that the combination weights for the monochrome image increase with increasing difference between the locations of the features in the monochrome image with the locations of the features in the color image.

14. The method of claim 12, the first camera and the second camera having substantially identical pixel resolution, the first camera having a first field of view, and the second camera having a second field of view that is greater than the first field of view.

15. The method of claim 12, the first camera being substantially identical to the second camera, at least one of exposure time and gain for the first image being greater than exposure time and gain, respectively, for the second image.

16. A system for combining array camera images with feature-based ghost removal, comprising:
- a processor; and
- memory communicatively coupled with the processor and including machine-readable instructions configured to, upon execution by the processor, process a first image and a second image to determine a ghost mask defining combination weights for combining the first image with the second image, the machine-readable instructions including:
  - (a) geometric correction instructions that, upon execution by the processor, rectify and align the first image and the second image,
  - (b) feature identification instructions that, upon execution by the processor and execution of the geometric correction instructions, identify features in the first image to produce at least one first feature image each indicating features in the first image, and identify features in the second image to produce at least one second feature image each indicating features in the second image, the feature identification instructions being configured to filter the first image to generate the at least one first feature image, and filter the second image to generate the at least one second feature image, and
  - (c) ghost mask generation instructions that, upon execution by the processor, compare the at least one first feature image with the at least one second feature image to determine the ghost mask, the ghost mask generation instructions being configured to, for each pixel of the ghost mask, perform steps of:
    - (1) for each pixel in a local region surrounding the pixel of the ghost mask, applying a smooth function to a measure of difference between the at least one first feature image and the at least one second feature image at the pixel in the local region, the smooth function (i) having a single peak that is attained when the measure is zero and (ii) decreasing with increasing value of the measure, and
    - (2) setting value of the pixel in the ghost mask to average value of the smooth function over the local region.

17. The system of claim 16, further comprising the array camera, the processor being communicatively coupled with the array camera.

18. The system of claim 17, further comprising a smartphone, each of the array camera, the processor, and the memory being implemented onboard the smartphone.

19. The system of claim 16, the machine-readable instructions further comprising combination instructions that, upon execution by the processor, combine the first image with the second image according to the combination weights of the ghost mask, to produce a combined image with reduced ghost artifacts after execution of the geometric correction instructions, of the first image and the second image.

20. The system of claim 19, further comprising an interface for outputting the combined image.

* * * * *